United States Patent
Iwasaki et al.

(10) Patent No.: US 9,929,430 B2
(45) Date of Patent: Mar. 27, 2018

(54) COMPOSITE ACTIVE MATERIAL, MANUFACTURING METHOD FOR COMPOSITE ACTIVE MATERIAL, AND LITHIUM SECONDARY BATTERY INCLUDING COMPOSITE ACTIVE MATERIAL

(71) Applicant: TOYOTA JIDOSHA KABUSHIKI KAISHA, Toyota-shi, Aichi-ken (JP)

(72) Inventors: Masahiro Iwasaki, Susono (JP); Yusuke Kintsu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 14/763,852

(22) PCT Filed: Feb. 6, 2014

(86) PCT No.: PCT/IB2014/000119
§ 371 (c)(1),
(2) Date: Jul. 28, 2015

(87) PCT Pub. No.: WO2014/122520
PCT Pub. Date: Aug. 14, 2014

(65) Prior Publication Data
US 2015/0372344 A1    Dec. 24, 2015

(30) Foreign Application Priority Data
Feb. 8, 2013   (JP) ................. 2013-023890

(51) Int. Cl.
*H01M 4/131* (2010.01)
*H01M 10/0525* (2010.01)
(Continued)

(52) U.S. Cl.
CPC ..... *H01M 10/0525* (2013.01); *H01M 4/0402* (2013.01); *H01M 4/131* (2013.01);
(Continued)

(58) Field of Classification Search
CPC ............. H01M 10/0525; H01M 4/485; H01M 4/0402; H01M 10/0562; H01M 4/505;
(Continued)

(56) References Cited

U.S. PATENT DOCUMENTS

2011/0027661 A1    2/2011   Okazaki et al.
2011/0195315 A1 *  8/2011   Tsuchida .................. H01M 4/13
                                                          429/319
(Continued)

FOREIGN PATENT DOCUMENTS

CN    101953000 A    1/2011
CN    102893431 A    1/2013
(Continued)

*Primary Examiner* — Cynthia K Walls
(74) *Attorney, Agent, or Firm* — Oliff PLC

(57) ABSTRACT

A composite active material including composite particles and a sulfide-based solid electrolyte is proposed. The composite particles contain active material particles and an oxide-based solid electrolyte. The active material particles contain at least any one of a cobalt element, a nickel element and a manganese element and further contain a lithium element and an oxygen element. The oxide-based solid electrolyte coats all or part of a surface of each of the active material particles. The sulfide-based solid electrolyte further coats 76.0% or more of a surface of each of the composite particles.

9 Claims, 19 Drawing Sheets

(51) Int. Cl.
  *H01M 4/1391* (2010.01)
  *H01M 4/36* (2006.01)
  *H01M 4/505* (2010.01)
  *H01M 4/525* (2010.01)
  *H01M 4/62* (2006.01)
  *H01M 10/0562* (2010.01)
  *H01M 4/04* (2006.01)
  *H01M 4/485* (2010.01)
  *H01M 4/02* (2006.01)

(52) U.S. Cl.
  CPC ......... *H01M 4/1391* (2013.01); *H01M 4/362* (2013.01); *H01M 4/366* (2013.01); *H01M 4/485* (2013.01); *H01M 4/505* (2013.01); *H01M 4/525* (2013.01); *H01M 4/624* (2013.01); *H01M 10/0562* (2013.01); *H01M 2004/021* (2013.01); *H01M 2300/0068* (2013.01); *H01M 2300/0071* (2013.01)

(58) Field of Classification Search
  CPC ...... H01M 4/525; H01M 4/624; H01M 4/131; H01M 4/362; H01M 4/366; H01M 4/1391; H01M 2300/0071; H01M 2300/0068; Y02E 60/122
  See application file for complete search history.

(56) References Cited

U.S. PATENT DOCUMENTS

2013/0059209 A1    3/2013   Ota et al.
2014/0287324 A1*   9/2014   Tsuchida .............. H01M 4/366
                                                          429/304

FOREIGN PATENT DOCUMENTS

| JP | 2002-373643 A | 12/2002 | |
| JP | 2010-073539 A | 4/2010 | |
| JP | 2011-187370 A | 9/2011 | |
| KR | 10-2010-0120153 A | 11/2010 | |
| WO | 2011/145462 A1 | 11/2011 | |
| WO | 2013/073214 A1 | 5/2013 | |
| WO | WO 2013/073214 * | 5/2013 | ........ H01M 10/0562 |
| WO | 2014/010341 A1 | 1/2014 | |

* cited by examiner

F I G . 12A
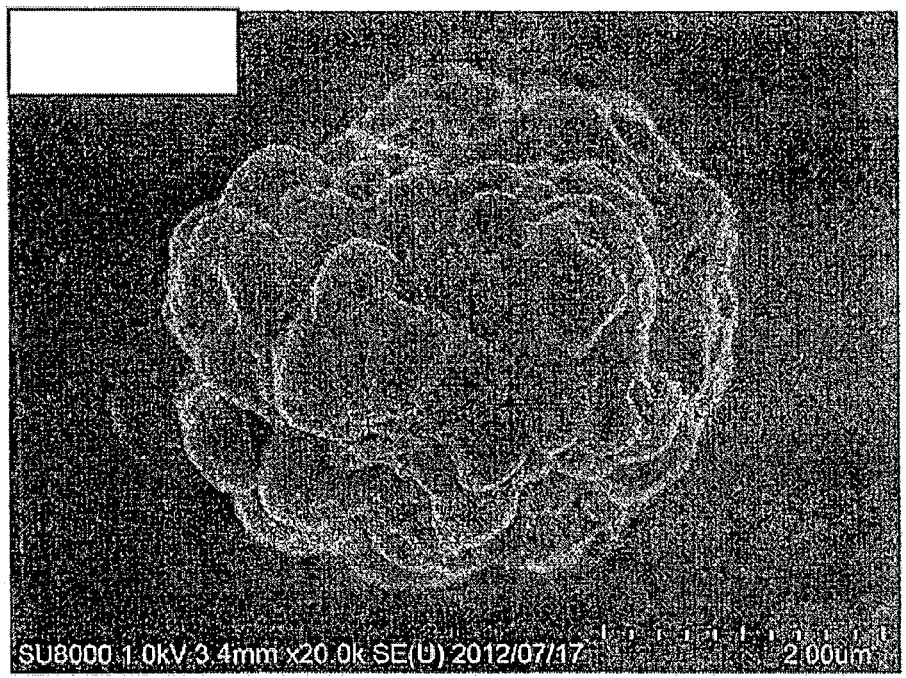
F I G . 12B
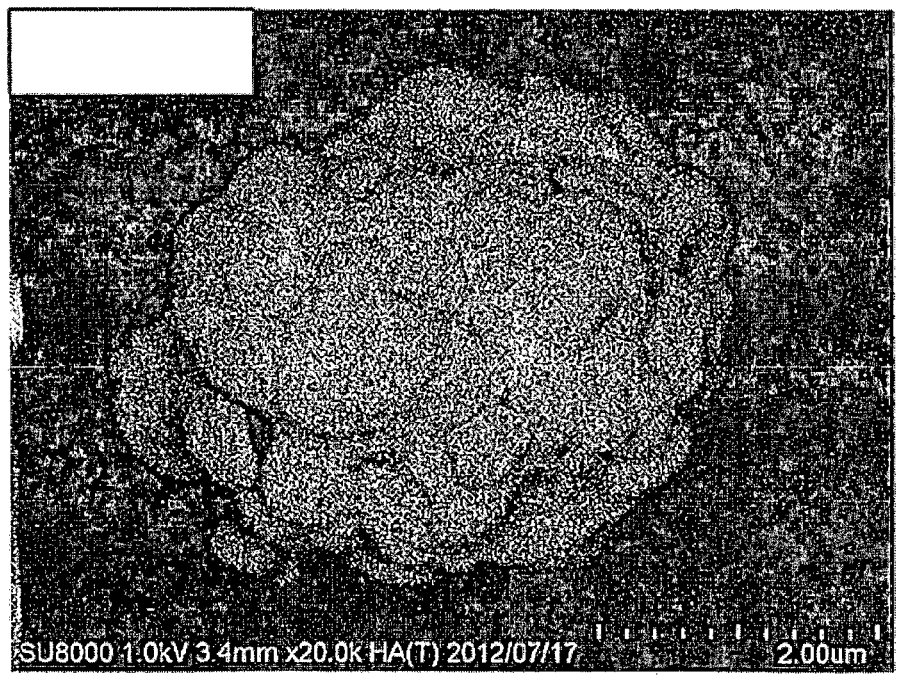

F I G . 17
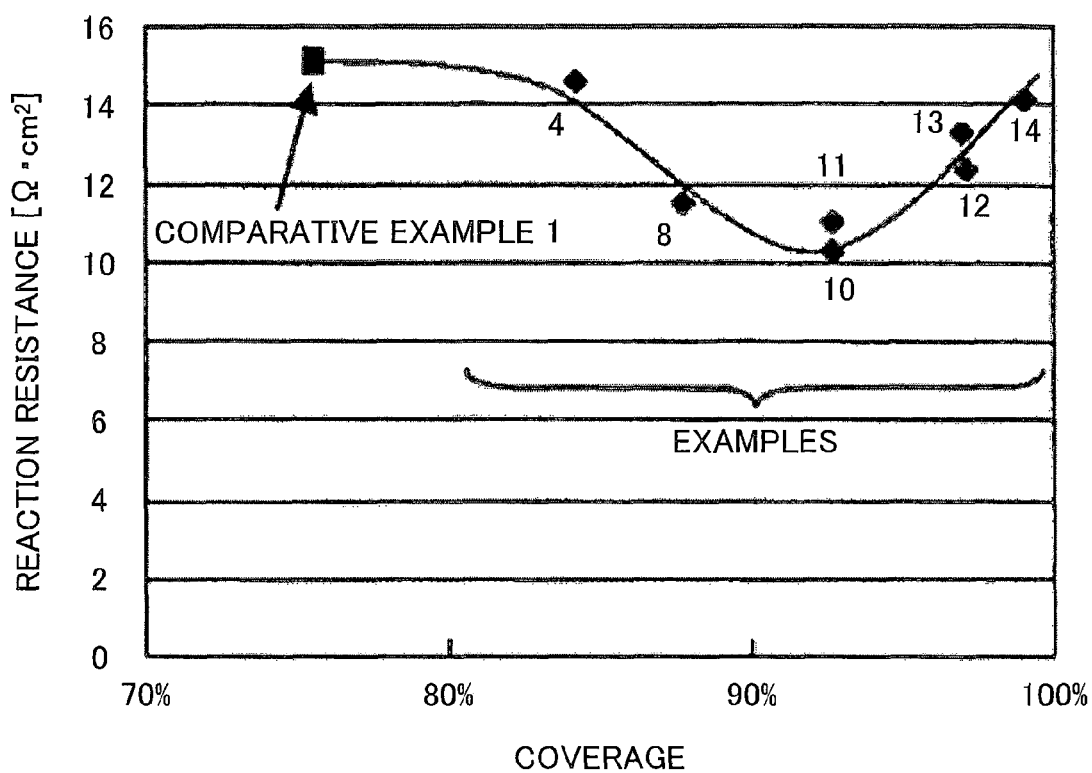
F I G . 18
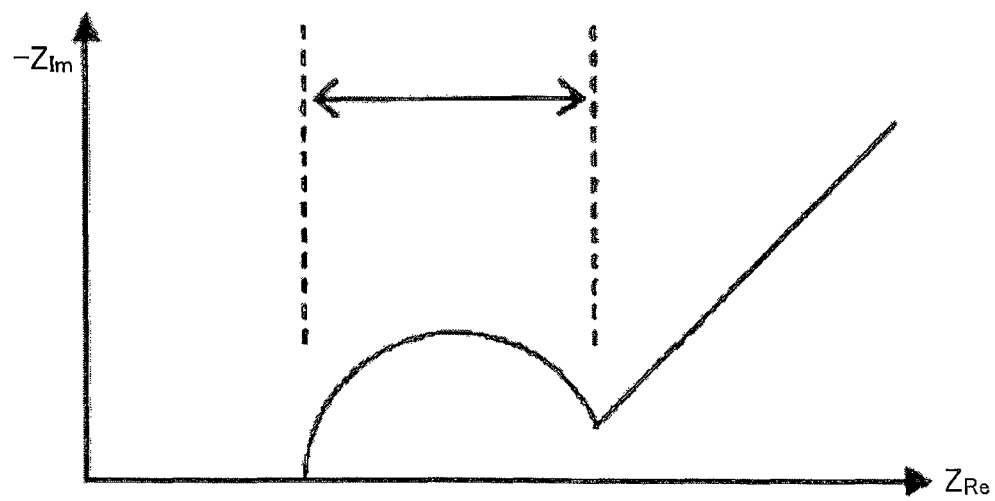

F I G . 19A
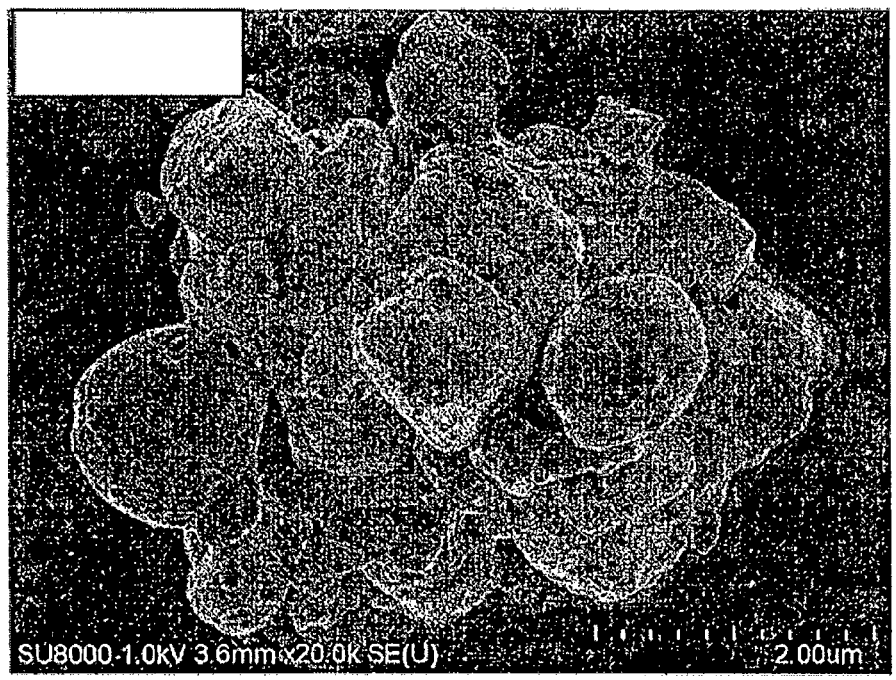
F I G . 19B
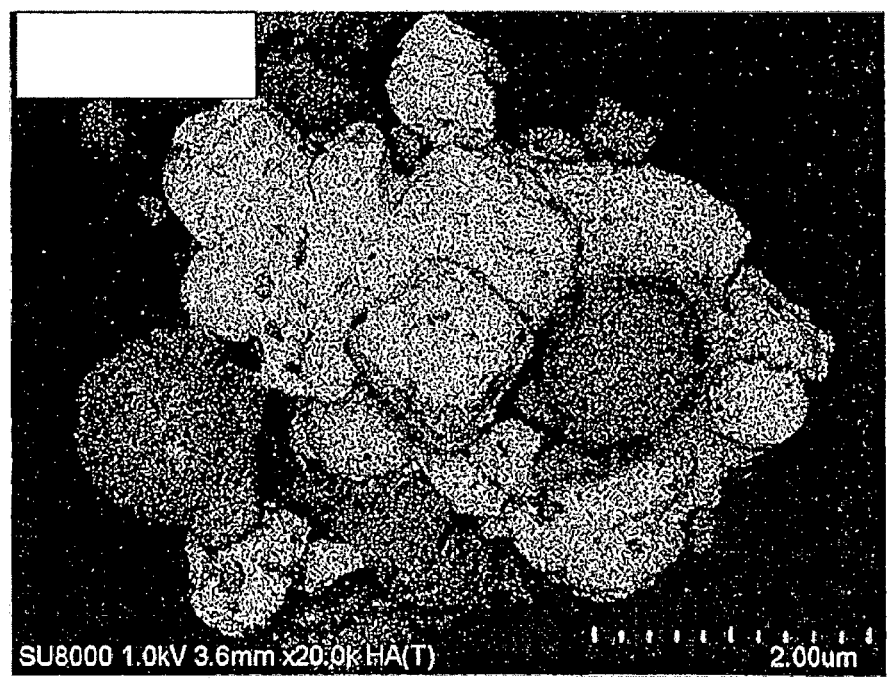

COMPOSITE ACTIVE MATERIAL, MANUFACTURING METHOD FOR COMPOSITE ACTIVE MATERIAL, AND LITHIUM SECONDARY BATTERY INCLUDING COMPOSITE ACTIVE MATERIAL

BACKGROUND OF THE INVENTION

1. Field of the Invention

The invention relates to a composite active material that is able to reduce a reaction resistance as compared to an existing composite active material when mainly used in a lithium secondary battery, a manufacturing method for the composite active material, and a lithium secondary battery including the composite active material:

2. Description of Related Art

Secondary batteries are not only able to convert chemical energy to electric energy and to supply electric energy (be discharged) but also able to convert electric energy to chemical energy and to store chemical energy (be charged) by passing an electric current in a direction opposite to that during discharging. Among the secondary batteries, lithium secondary batteries have a high energy density, so the lithium secondary batteries are widely used as power supplies for mobile devices, such as laptop personal computers and cellular phones.

In the lithium secondary batteries, when graphite (denoted by C) is used as a negative electrode active material, the reaction expressed by the following formula (I) proceeds at a negative electrode during discharging.

$$Li_xC_6 \rightarrow 6C + xLi^+ + xe^- \qquad (I)$$

(In the above-described formula (I), 0<x<1)
Electrons produced from the reaction expressed by the above-described formula (I) pass through an external circuit, work at an external load and then reach a positive electrode. Lithium ions (Li⁺) produced from the above-described formula (I) move inside an electrolyte from the negative electrode side to the positive electrode side due to electro-endosmosis. The electrolyte is held between the negative electrode and the positive electrode.

When lithium cobalt oxide ($Li_{1-x}CoO_2$) is used as a positive electrode active material, the reaction expressed by the following formula (II) proceeds at the positive electrode during discharging.

$$Li_{1-x}CoO_2 + xLi^+ + xe^- \rightarrow LiCoO_2 \qquad (II)$$

(In the above-described formula (II), 0<x<1)
During discharging, the reverse reactions of the above-described formula (I) and formula (II) respectively proceed at the negative electrode and the positive electrode, graphite ($Li_xC_6$) in which lithium is intercalated by graphite intercalation is reproduced at the negative electrode, and lithium cobalt oxide ($Li_{1-x}CoO_2$) is reproduced at the positive electrode, so discharging becomes possible again.

Electrodes that are used in lithium secondary batteries are important members that determine the charge/discharge characteristics of the batteries, and various researches have been made so far. For example, Japanese Patent Application Publication No. 2010-073539 (JP 2010-073539 A) describes an electrode body that includes a positive electrode active material and a solid electrolyte. The positive electrode active material contains lithium cobalt oxide. A coating layer containing lithium niobate is formed on at least part of the surface of the lithium cobalt oxide. The solid electrolyte contains a solid sulfide.

SUMMARY OF THE INVENTION

JP 2010-073539 A describes that a positive electrode active material in which a layer of $LiNbO_3$ is formed on the surface of $LiCoO_2$ is mixed with $Li_7P_3S_{11}$ (sulfide-based solid electrolyte) at the mass ratio of Positive electrode active material: Solid electrolyte=7:3 to form a positive electrode (at paragraph 0038 in the specification of JP 2010-073539 A). However, as a result of a study conducted by the inventors, it has been found that a reaction resistance is high because there are many particles of the positive electrode active material, not in direct contact with the sulfide-based solid electrolyte, in the electrode body described in JP 2010-073539 A. The invention provides a composite active material that is able to reduce a reaction resistance as compared to that of an existing composite active material when mainly used in a lithium secondary battery, a manufacturing method for the composite active material, and a lithium secondary battery including the composite active material.

A first aspect of the invention provides a composite active material. The composite active material includes: composite particles and a sulfide-based solid electrolyte. The composite particles contain active material particles and an oxide-based solid electrolyte. The active material particles contain at least any one of a cobalt element, a nickel element and a manganese element and further contain a lithium element and an oxygen element. The oxide-based solid electrolyte coats all or part of a surface of each of the active material particles. The sulfide-based solid electrolyte further coats 76.0% or more of a surface of each of the composite particles.

In the composite active material according to the first aspect of the invention, the sulfide-based solid electrolyte may coat 85% or more and 95% or less of the surface of each of the composite particles.

A second aspect of the invention provides a manufacturing method for a composite active material. The manufacturing method includes: a preparation step of preparing composite particles containing active material particles and an oxide-based solid electrolyte, the active material particles containing at least any one of a cobalt element, a nickel element and a manganese element and further containing a lithium element and an oxygen element, the oxide-based solid electrolyte coating all or part of a surface of each of the active material particles; and a coating step of coating a surface of each of the composite particles with a sulfide-based solid electrolyte by mixing the composite particles with the sulfide-based solid electrolyte with application of an energy, at which the sulfide-based solid electrolyte plastically deforms, while a temperature of a mixture of the composite particles and the sulfide-based solid electrolyte is adjusted to 100° C. or below.

In the manufacturing method according to the second aspect of the invention, in the coating step, sulfide-based solid electrolyte particles having a mean particle diameter of 1 μm or smaller may be used as the sulfide-based solid electrolyte.

In the manufacturing method according to the second aspect of the invention, in the coating step, the sulfide-based solid electrolyte may be further added to the mixture after mixing for 10 minutes or longer, and may be mixed with application of the energy, at which the sulfide-based solid electrolyte plastically deforms, while the temperature of the mixture is adjusted to 100° C. or below.

The manufacturing method according to the second aspect of the invention may further include a pretreatment step of mixing at least any one of the composite particles and the sulfide-based solid electrolyte with a compound having an alkyl group before the coating step.

A third aspect of the invention provides a lithium secondary battery. The lithium secondary battery includes a positive electrode; a negative electrode; and an electrolyte layer interposed between the positive electrode and the negative electrode. At least one of the positive electrode and the negative electrode contains at least one of the above-described composite active material and the composite active material manufactured in accordance with the above-described manufacturing method.

According to the aspects of the invention, by setting the coverage of the sulfide-based solid electrolyte on the surface of each of the composite particles to 76.0% or higher, it is possible to reduce the reaction resistance at the time when used in a lithium secondary battery as compared to the existing composite active material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 12A and FIG. 12B are surface SEM images of a composite active material according to Example 12;

FIG. 17 is a graph that shows the correlation between the coverage of each of the composite active materials according to Example 4, Example 8, Example 10 to Example 14 and Comparative Example 1 and a reaction resistance of each of lithium secondary batteries that use those composite active materials;

FIG. 18 is a schematic view of a Nyquist diagram that is obtained through a high-frequency impedance method;

FIG. 19A and FIG. 19B are surface SEM images of a composite active material according to Comparative Example 1.

DETAILED DESCRIPTION OF EMBODIMENTS

1. Composite Active Material

Figure 1A:
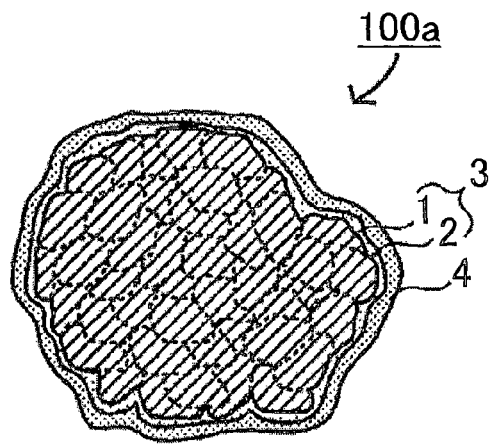
FIG. 1A to FIG. 1D are schematic cross-sectional views of composite active materials according to embodiments of the invention.

A composite active material according to the invention includes: composite particles and a sulfide-based solid electrolyte. The composite particles contain active material particles and an oxide-based solid electrolyte. The active material particles contain at least one of a cobalt element, a nickel element and a manganese element and further contain a lithium element and an oxygen element. The oxide-based solid electrolyte coats all or part of a surface of each of the active material particles. The sulfide-based solid electrolyte further coats 76.0% or more of a surface of each of the composite particles.

An existing method of coating a surface of each of active material-containing particles with a sulfide-based solid electrolyte may be, for example, a gas phase method, such as pulsed laser deposition (hereinafter, may be referred to as PLD). However, the PLD generally has a low deposition rate, so the productivity is remarkably low. Therefore, it is not practical. In the PLD, a target of a sulfide-based solid electrolyte is plasmarized by laser irradiation. At this time, there is a concern that the composition of the sulfide-based solid electrolyte alters and the composition in the solid state is not maintained. Another method of coating the surface of each of active material-containing particles with a sulfide-based solid electrolyte may be, for example, a kneading method that uses a medium, such as a planetary ball mill. However, in such a kneading method that uses a medium, mechanical damage is applied by a collision with the medium, with the result that the surface of each of active material-containing particles may be damaged. Thus, in order to avoid such mechanical damage, a kneading method that does not use a medium is desired.

The inventors conducted researches over and over on a condition for improving a coverage without altering the composition of a sulfide-based solid electrolyte at the time of further coating each of the composite particles, in which the surface of each active material particle is coated with an oxide-based solid electrolyte, with the sulfide-based solid electrolyte. The inventors diligently made an effort and, as a result, found that a composite active material having a higher coverage than that of an existing composite active material is obtained by setting the temperature of a mixture of composite particles and a sulfide-based solid electrolyte and an energy at the time of mixing within certain specific ranges at the time of coating each of the composite particles with the sulfide-based solid electrolyte. The inventors found that the reaction resistance of a lithium secondary battery that uses the thus-obtained composite active material depends on the coverage of the sulfide-based solid electrolyte on the surface of each composite particle and the composite active material having a specific range of the coverage is able to reduce the reaction resistance at the time when used in a lithium secondary battery as compared to an existing composite active material, and finished the invention.

The composite active material according to the invention includes the composite particles that serve as cores and a sulfide-based solid electrolyte that coat the surface of each of the composite particles. Hereinafter, these composite particles and sulfide-based solid electrolyte will be sequentially described.

1-1. Composite Particles

The composite particles according to the invention include active material particles and an oxide-based solid electrolyte coating all or part of a surface of each of the active material particles. The active material particles according to the invention are compound particles that contain at least any one of a cobalt element (Co), a nickel element (Ni) and a manganese element (Mn), and that further contain a lithium element (Li) and an oxygen element (O). The active material particles are not specifically limited as long as the active material particles work as an electrode active material and, specifically, the active material particles are able to occlude and/or emit ions, such as lithium ions. The active material particles according to the invention may be, for example, the ones expressed by the following composition formula (A).

$$Li_mNi_{1-x-y}Co_xMn_yM_zO_n \quad (A)$$

(In the above-described composition formula (A), M denotes at least one element selected from the group consisting of a phosphorus element (P), a titanium element (Ti), a tungsten element (W), a zirconium element (Zr) and an aluminum element (Al), m denotes a real number that satisfies $0<m\leq2$, x and y denote real numbers that respectively satisfy $0\leq x\leq1$ and $0\leq y\leq1$, z denotes a real number that satisfies $0<z\leq2$, and n denotes a real number that satisfies $0<n\leq4$.)

The active material particles according to the invention may be, specifically, $LiCoO_2$, $LiNiO_2$, $LiMn_2O_4$, $LiCoMnO_4$, $Li_2NiMn_3O_8$, $LiNi_{1/3}Co_{1/3}Mn_{1/3}O_2$, $LiNiPO_4$, $LiMnPO_4$, or $Li_2NiTiO_4$. Among these active material particles, particularly, $LiNi_{1/3}Co_{1/3}Mn_{1/3}O_2$ is desirably used.

Carbon particles, such as natural graphite particles, may also be used as the active material particles according to the invention.

The active material particles according to the invention may be monocrystal particles of an active material or may be polycrystal active material particles in which a plurality of active material monocrystals are bound in crystal face level.

The mean particle diameter of the active material particles according to the invention is not specifically limited as long as the mean particle diameter is smaller than the mean particle diameter of the intended composite active material. The mean particle diameter of the active material particles is desirably 0.1 to 30 μm. When each of the active material particles are a polycrystal active material particle in which a plurality of active material crystals are bound, the mean particle diameter of the active material particles means the mean particle diameter of the polycrystal active material particles. The mean particle diameter of the particles according to the invention is calculated by an ordinary method. An example of a method of calculating the mean particle diameter of the particles is as follows. Initially, the particle diameter of a certain one particle is calculated on the assumption that the certain one particle is spherical in a transmission electron microscope (hereinafter, referred to as TEM) image or scanning electron microscope (hereinafter, referred to as SEM) image at an appropriate magnification (for example, a magnification of 50,000 to 1,000,000). Such calculation of the particle diameter through TEM observation or SEM observation is performed on 200 to 300 particles of the same type, and the average of these particles is determined as a mean particle diameter.

The oxide-based solid electrolyte according to the invention is not specifically limited as long as the oxide-based solid electrolyte contains an oxygen element (O) and has a chemoaffinity for the active material particles to such a degree as to be able to coat all or part of the surface of each of the active material particles. The oxide-based solid electrolyte according to the invention may be, specifically, $LiNbO_3$, LiPON (lithium phosphorus oxynitride), $Li_{1.3}Al_{0.3}Ti_{1.7}(PO_4)_3$, $La_{0.51}Li_{0.34}TiO_{2.94}$, $Li_3PO_4$, $Li_2SiO_2$ or $Li_2SiO_4$. Among these oxide-based solid electrolytes, particularly, $LiNbO_3$ is desirably used. A method of preparing the composite particles will be described in the chapter of "2. Method of Manufacturing Composite Active Material" (described later).

The thickness of an oxide-based solid electrolyte layer is desirably 1 nm to 100 nm. When the thickness of the oxide-based solid electrolyte layer is too large, the resistance may be large, so it is desirable that the thickness of the oxide-based solid electrolyte layer be small as much as possible and the coverage of the oxide-based solid electrolyte layer on the surface of each active material particle be high. On the other hand, when the thickness of the oxide-based solid electrolyte layer is too small, there may be a portion of the surface of each active material particle, not coated with the oxide-based solid electrolyte layer, and, as a result, the active material particles contact the sulfide-based solid electrolyte, and undergo reaction degradation. Therefore, the resistance may increase. The mean thickness of the solid electrolyte layer (the oxide-based solid electrolyte layer and the sulfide-based solid electrolyte layer) is calculated by an ordinary method. An example of a method of calculating the mean thickness of the solid electrolyte layer is as follows. Initially, in a TEM image or SEM image of an appropriate magnification (for example, a magnification of 50,000 to 1,000,000), the thickness of the solid electrolyte layer is measured at 5 to 10 points for a certain one particle (a composite particle or a composite active material). Such measurement of the thickness through TEM observation or SEM observation is performed for 200 to 300 particles of the same type, and the average of all the measured thicknesses of these particles is determined as a mean thickness.

In the invention, by interposing the oxide-based solid electrolyte between each active material particle and the sulfide-based solid electrolyte, it is possible to suppress reaction degradation due to contact between each active material particle and the sulfide-based solid electrolyte.

1-2. Sulfide-Based Solid Electrolyte

The sulfide-based solid electrolyte according to the invention further coats 76.0% or more of the surface of each of the above-described composite particles. Here, 76.0% is a lower limit of the coverage of the sulfide-based solid electrolyte when the entire surface area of each composite particle is 100% (hereinafter, may be referred to as the coverage of the sulfide-based solid electrolyte). When the coverage of the sulfide-based solid electrolyte is lower than 76.0%, a composite active material, as in the case of a composite active material according to Comparative Example 1 (described later), exhibits a high reaction resistance when used in a battery. The coverage of the sulfide-based solid electrolyte is desirably higher than or equal to 85% and lower than or equal to 95%, and is more desirably higher than or equal to 87% and lower than or equal to 93%. When the coverage of the sulfide-based solid electrolyte exceeds 95%, it is assumed that a contact probability between an electrical conduction aid, which is an electrode material, and each active material particle decreases and an electron conducting path is interrupted in the case where the composite active material is, for example, mixed into one of the electrodes of a battery. Therefore, there is a concern that the composite active material exhibits a high reaction resistance when used in a battery. When the coverage of the sulfide-based solid electrolyte is lower than 85%, the surface of each composite particle is not sufficiently coated with the sulfide-based solid electrolyte. Therefore, when the composite active material is used in a battery, an ion conducting path is not sufficiently formed by the sulfide-based solid electrolyte, with the result that there is a concern that the composite active material exhibits a high reaction resistance. The coverage of the sulfide-based solid electrolyte is allowed to be calculated by a known method. A method of calculating the coverage of the sulfide-based solid electrolyte may be, for example, a method of measuring the composite active material by X-ray photoelectron spectroscopy (XPS), calculating an element ratio (ER) from the peak cross-sectional areas of the elements, and then calculating the coverage by using the following mathematical expression (B) on the basis of the element ratio (ER).

Coverage of Sulfide-based Solid Electrolyte=$\Sigma ER_S / (\Sigma ER_A + \Sigma ER_O + \Sigma ER_S)$ (B)

(In the above mathematical expression (B), $\Sigma ER_S$ denotes the total sum of the element ratios of the elements that compose the sulfide-based solid electrolyte and that are measurable by XPS, $\Sigma ER_A$ denotes the total sum of the element ratios of the elements that compose the active material particles and that are measurable by XPS, and $\Sigma ER_O$ denotes the total sum of the element ratios of the elements that compose the oxide-based solid electrolyte and that are measurable by XPS.)

The coverage of the sulfide-based, solid electrolyte according to the invention is allowed to be qualitatively determined by SEM, or the like. For example, a reflection electron image of SEM for the surface of each composite particle indicates that a difference in element distribution is small on the surface as the contrast reduces, and it is found that the surface of each composite particle is uniformly coated with the sulfide-based solid electrolyte at a high coverage. Particularly, in the case of the composite active material in which the surface of each composite particle is coated with particles of the sulfide-based solid electrolyte, it appears that, in a secondary electron image of SEM for the surface of each composite particle, as the unevenness reduces, grain boundaries of the sulfide-based solid electrolyte particles disappear and the surface of each composite particle is uniformly coated with the sulfide-based solid electrolyte. A measurement condition for a reflection electron image and secondary electron image of SEM may be, for example, a condition that measurement is carried out at a magnification of 1,000 to 50,000 under the conditions of an acceleration voltage of 0.5 to 5 kV and an emission current of 1 to 100 µA with the use of SEM (produced by Hitachi High-technologies Corporation, product number SU8030), or the like.

The sulfide-based solid electrolyte according to the invention is not specifically limited as long as the sulfide-based solid electrolyte contains a sulfur element (S) and has a chemoaffinity for the composite particles (particularly, the oxide-based solid electrolyte) to such a degree as to be able to coat the surface of each of the above-described composite particles. The sulfide-based solid electrolyte according to the invention may be, specifically, $Li_2S$—$P_2S_5$, $Li_2S$—$P_2S_3$, $Li_2S$—$P_2S_3$—$P_2S_5$, $Li_2S$—$SiS_2$, $Li_2S$—$Si_2S$, $Li_2S$—$B_2S_3$, $Li_2S$—$GeS_2$, $Li_2S$—$P_2S_5$—$LiI$, $Li_2S$—$P_2S_5$—$Li_2O$—$LiI$, $LiI$—$Li_2S$—$SiS_2$—$P_2S_5$, $Li_2S$—$SiS_2$—$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.75}Ge_{0.25}S_4$, or $Li_{4-x}Ge_{1-x}P_xS_4$. Among these sulfide-based solid electrolytes, particularly, the sulfide-based solid electrolyte that contains $Li_2S$—$P_2S_5$ in its composition is desirable, and $Li_2S$—$P_2S_5$—$Li_2O$—$LiI$ is more desirable.

The ratio of the mean thickness of the sulfide-based solid electrolyte layer to the mean particle diameter of the composite particles is desirably (Mean Particle Diameter of Composite Particles):(Mean Thickness of Sulfide-based Solid Electrolyte Layer)=30:1 to 95:1. When the sulfide-based solid electrolyte layer is too thick for the mean particle diameter of the composite particles, an electrical conduction aide, which is an electrode material, becomes hard to contact the active material particles in the case where the composite active material is, for example, mixed into an electrode of a battery, and an electron conduction path is interrupted, with the result that the resistance may increase. On the other hand, when the oxide-based solid electrolyte layer is too thin for the mean particle diameter of the composite particles, an ion path, such as a lithium ion path, may be interrupted, and the resistance may increase. In the invention, it is more desirable that (Mean Particle diameter of Composite Particles):(Mean Thickness of Sulfide-based Solid Electrolyte Layer)=38:1 to 63:1.

Although depending on application purpose, the mean particle diameter of the composite active material according to the invention may be, for example, 0.1 to 35 µm.

Figure 1B:
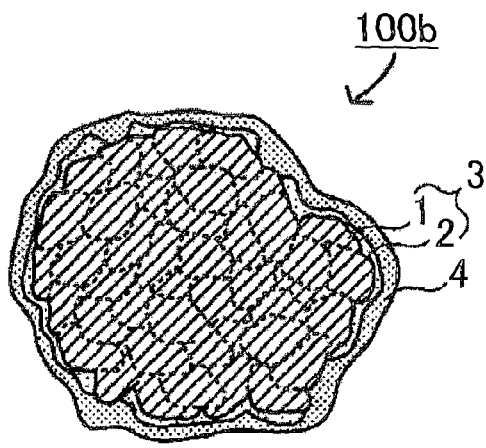
Figure 1C:
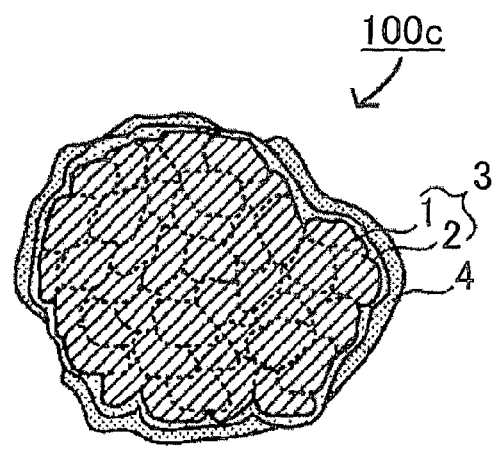
Figure 1D:
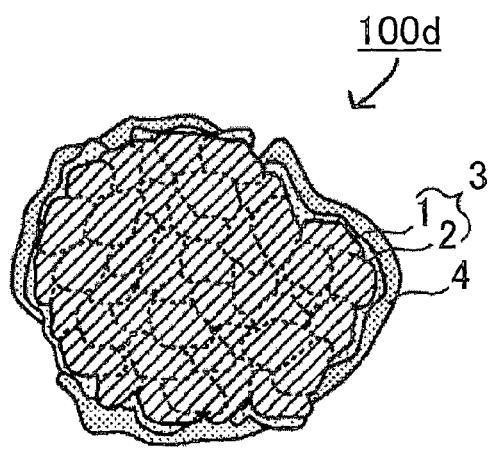
Figure 3:
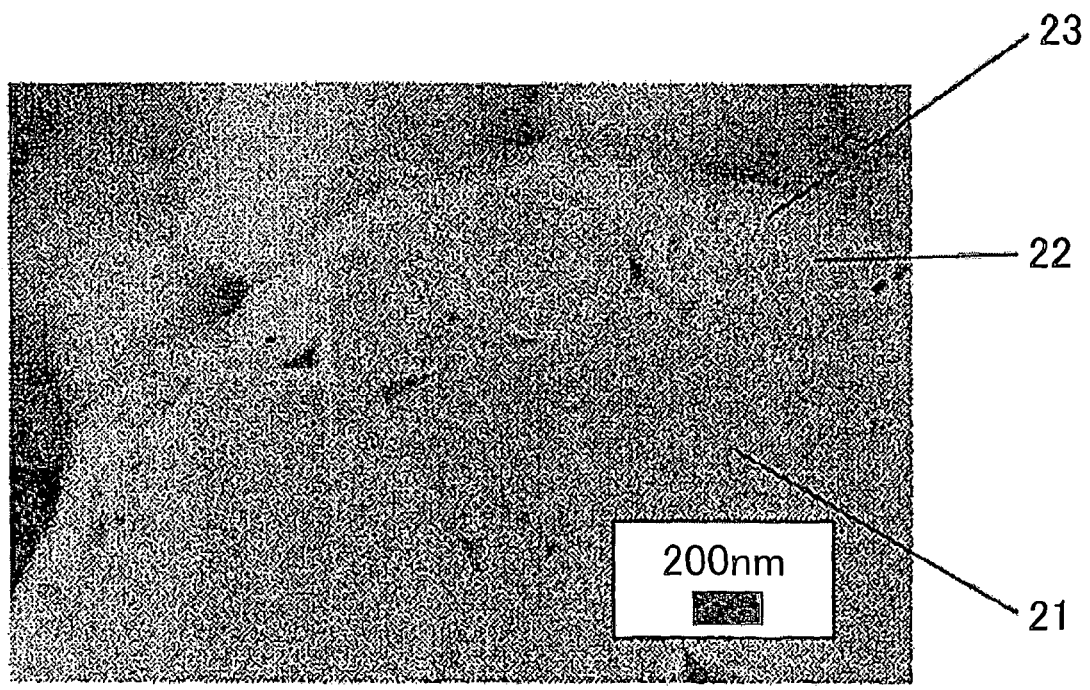
FIG. 3 is a cross-sectional SEM image of a composite active material according to Example 13.
Figure 4A:
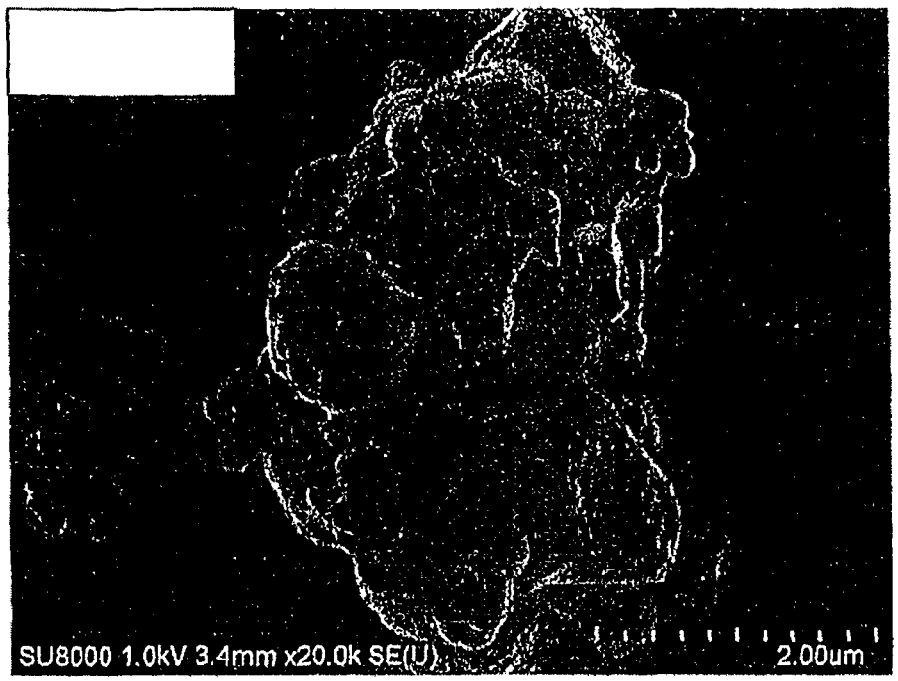
FIG. 4A and FIG. 4B are surface SEM images of a composite active material according to Example 1.
Figure 4B:
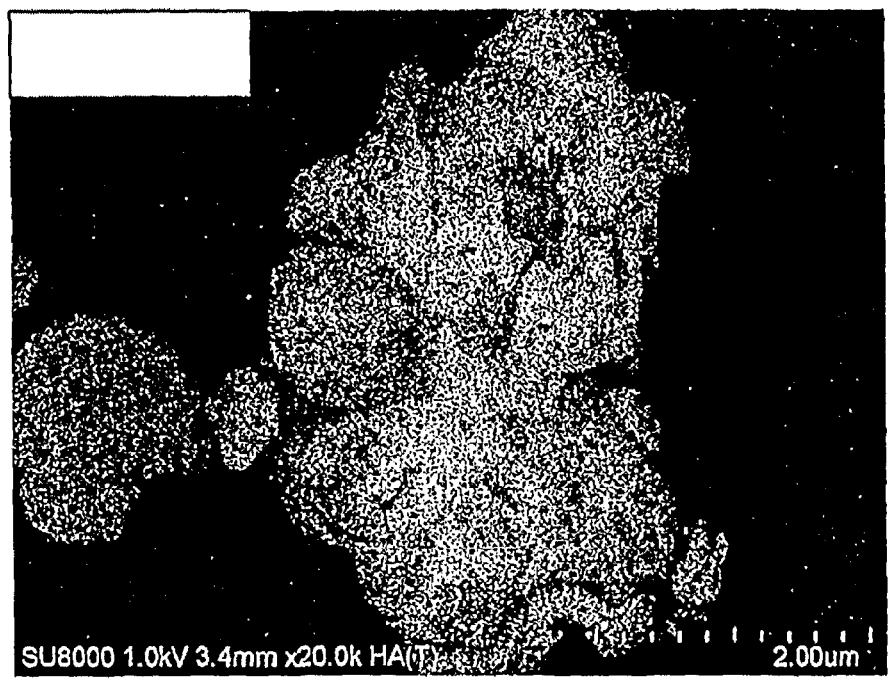
Figure 5A:
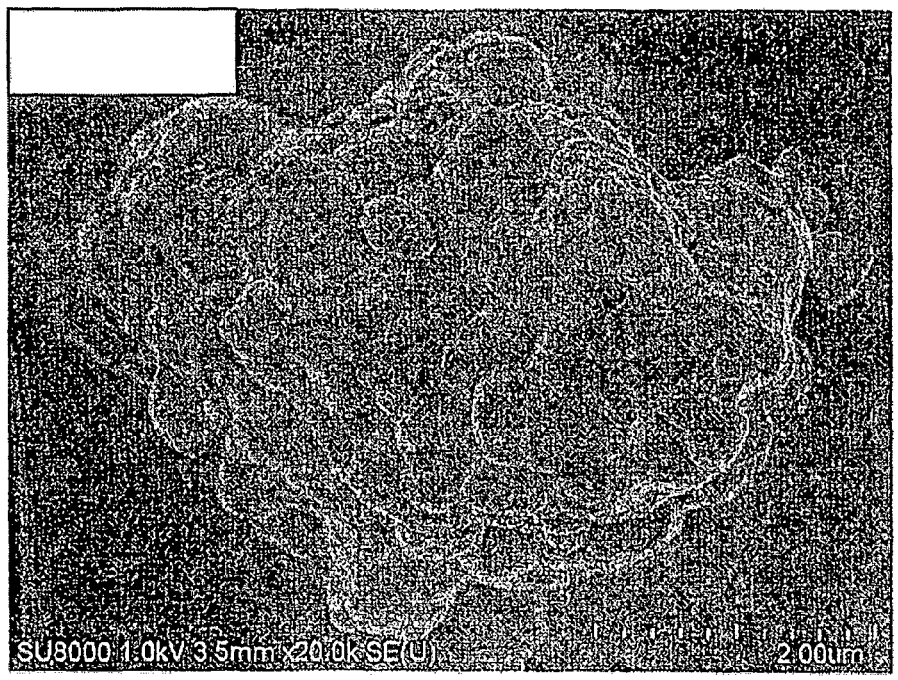
FIG. 5A and FIG. 5B are surface SEM images of a composite active material according to Example 2.
Figure 5B:
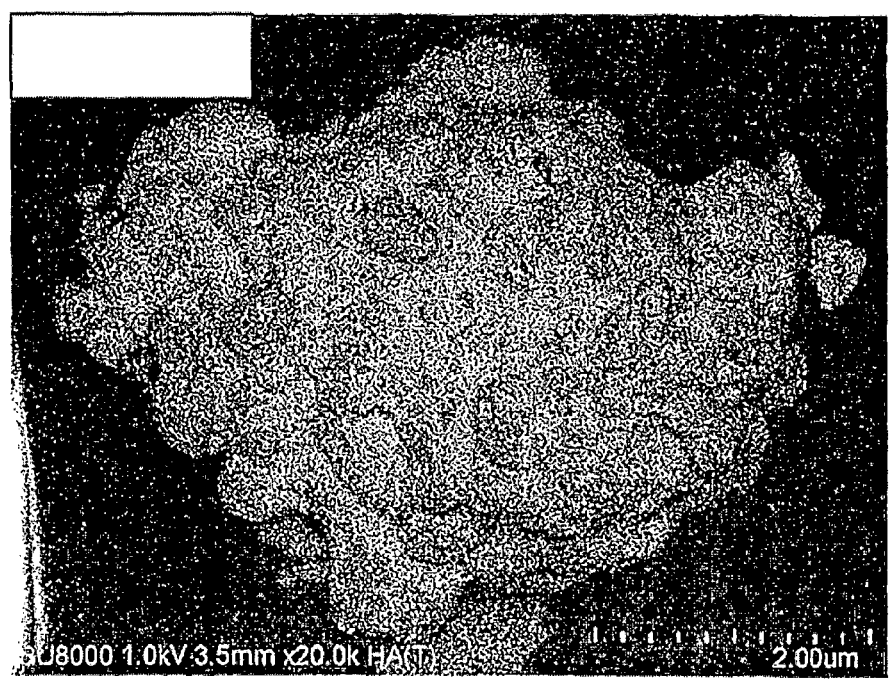
Figure 6A:
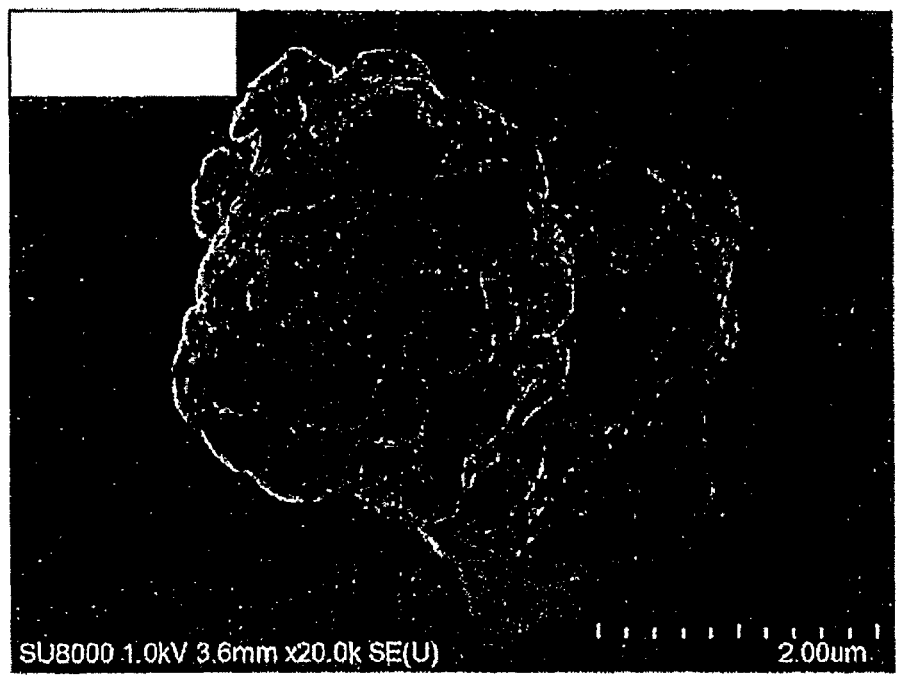
FIG. 6A and FIG. 6B are surface SEM images of a composite active material according to Example 3.
Figure 6B:
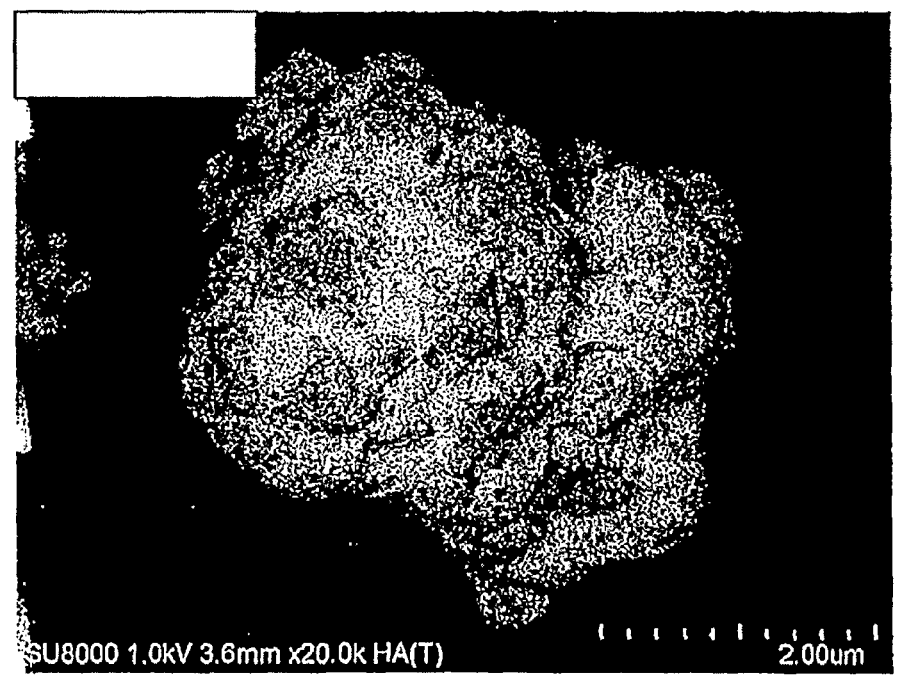
Figure 7A:
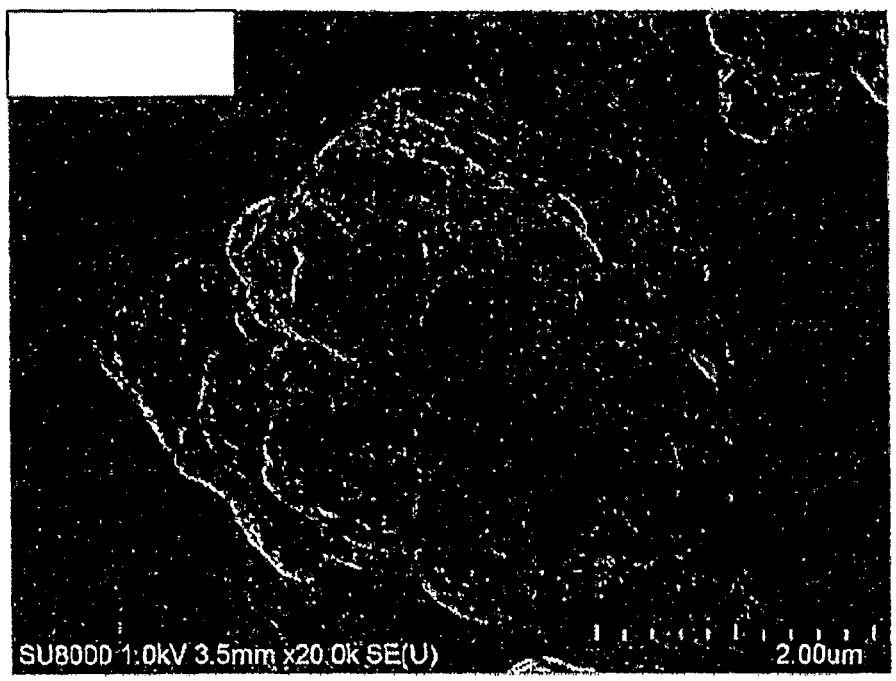
FIG. 7A and FIG. 7B are surface SEM images of a composite active material according to Example 4.
Figure 7B:
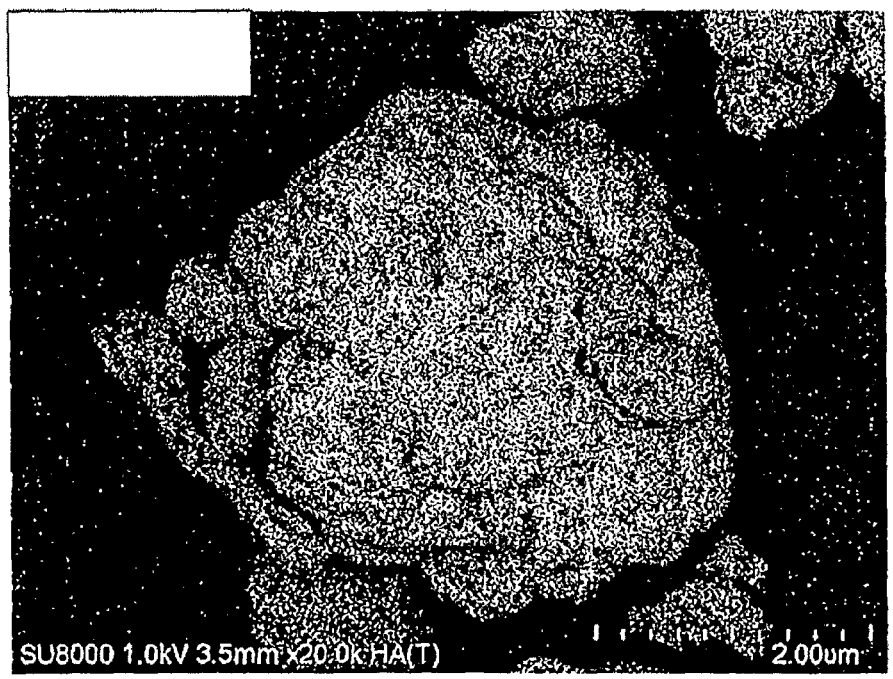
Figure 8A:
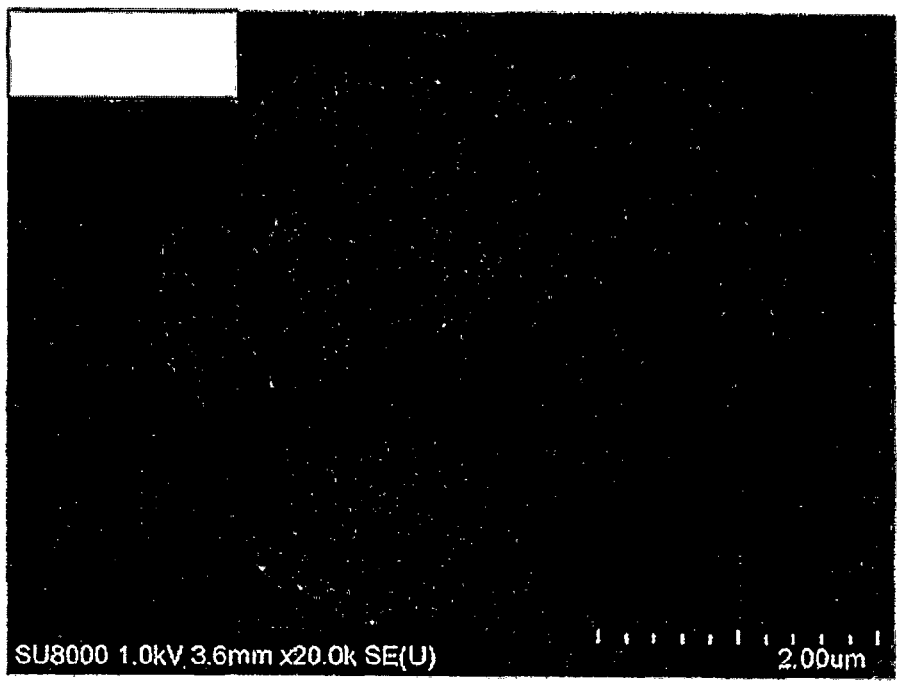
FIG. 8A and FIG. 8B are surface SEM images of a composite active material according to Example 8.
Figure 8B:
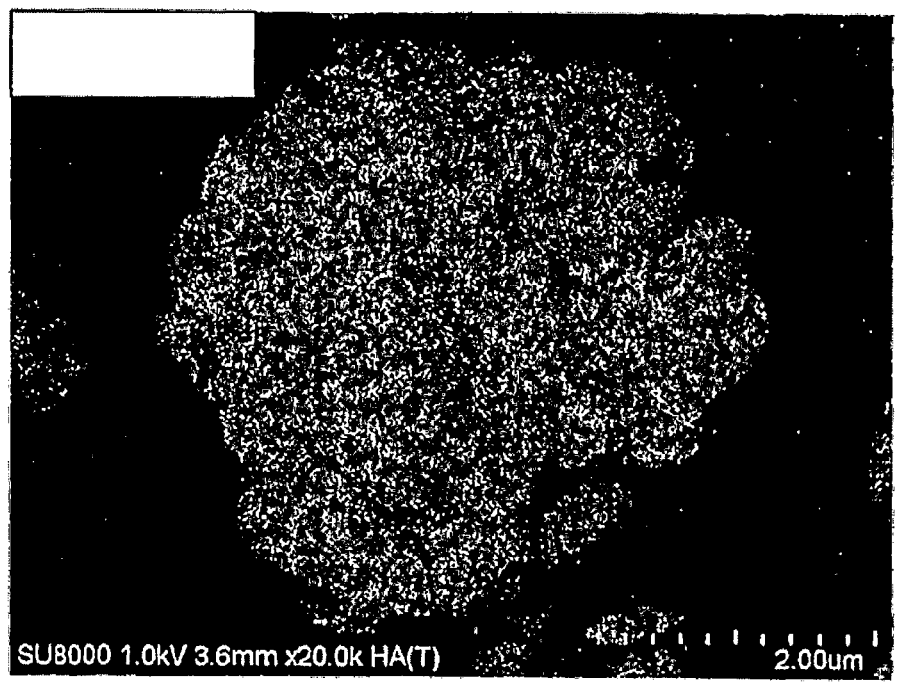
Figure 9A:
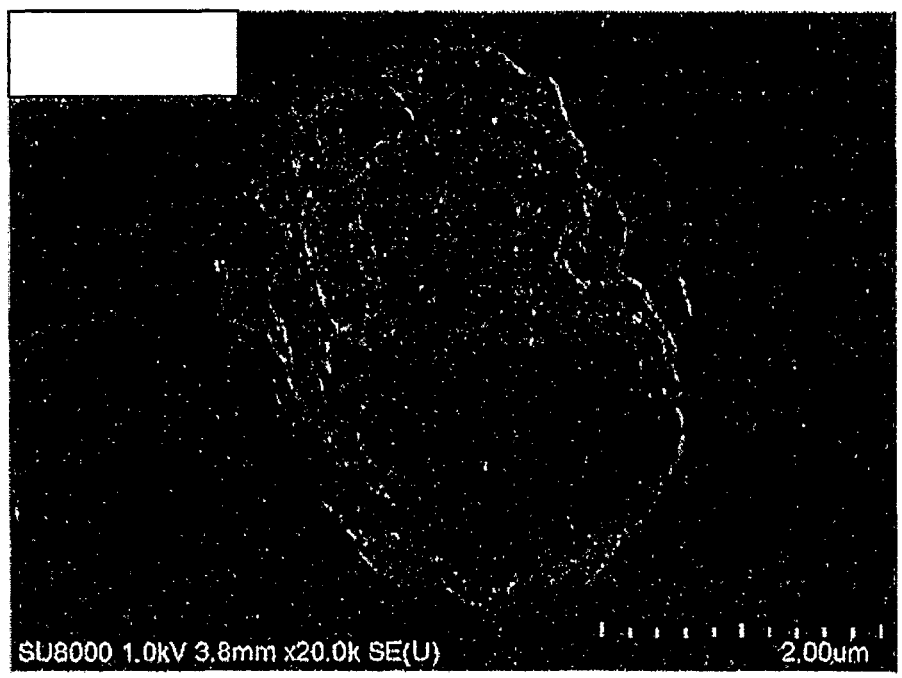
FIG. 9A and FIG. 9B are surface SEM images of a composite active material according to Example 9.
Figure 9B:
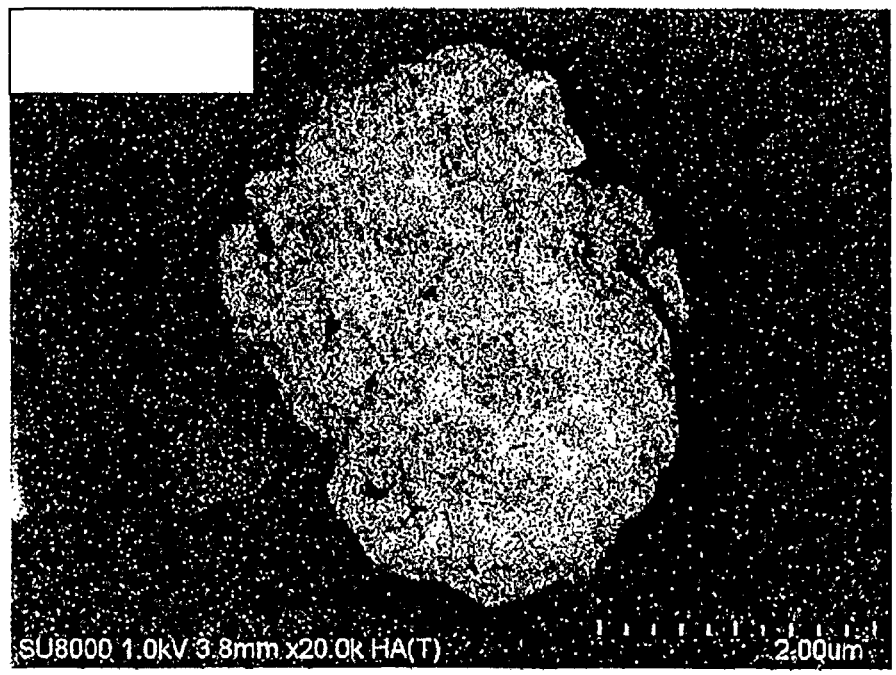
Figure 10A:
FIG. 10A and FIG. 10B are surface SEM images of a composite active material according to Example 10.
Figure 10B:
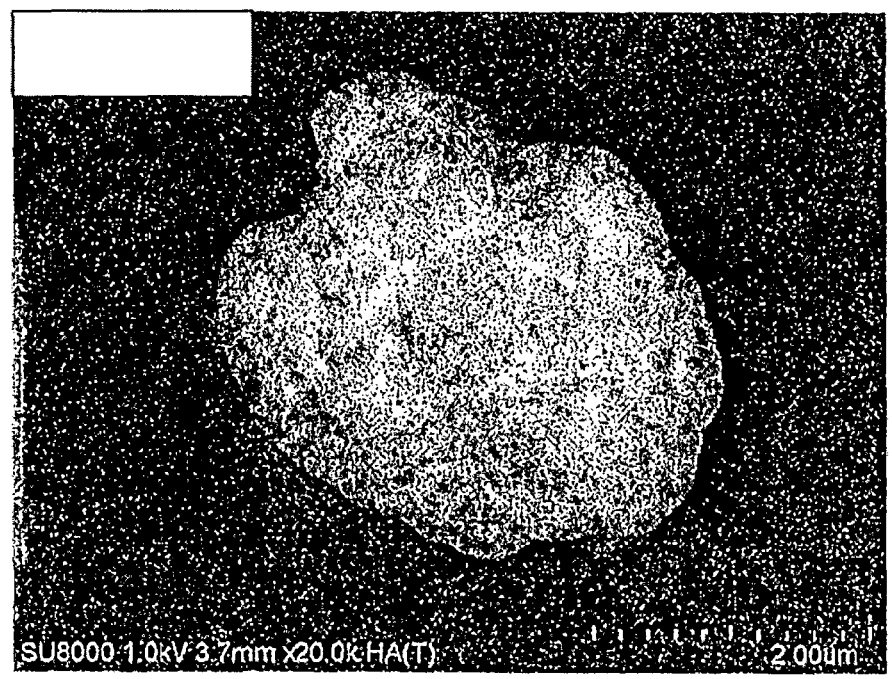
Figure 11A:
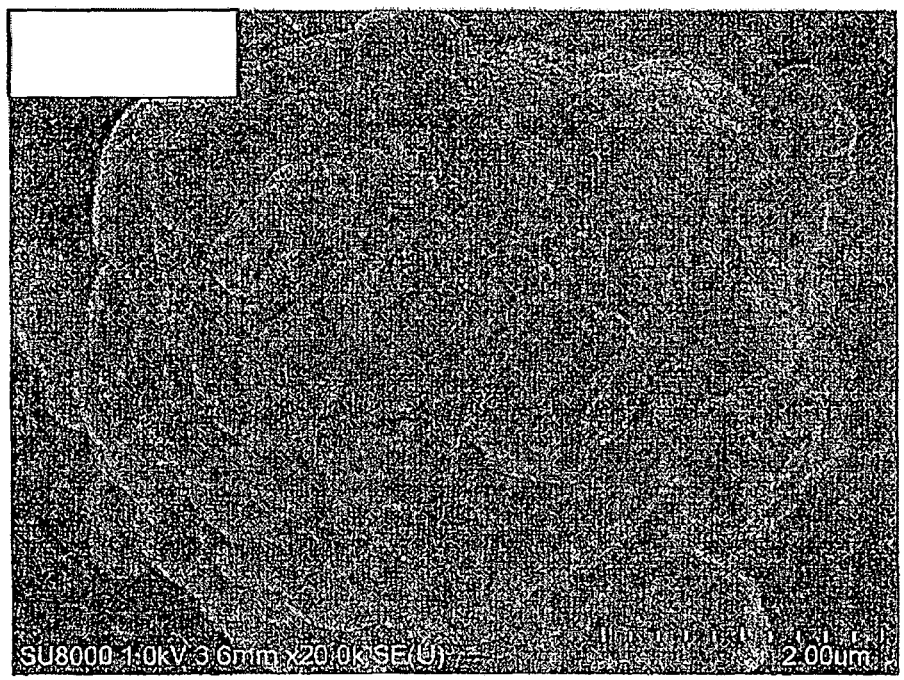
FIG. 11A and FIG. 11B are surface SEM images of a composite active material according to Example 11.
Figure 11B:
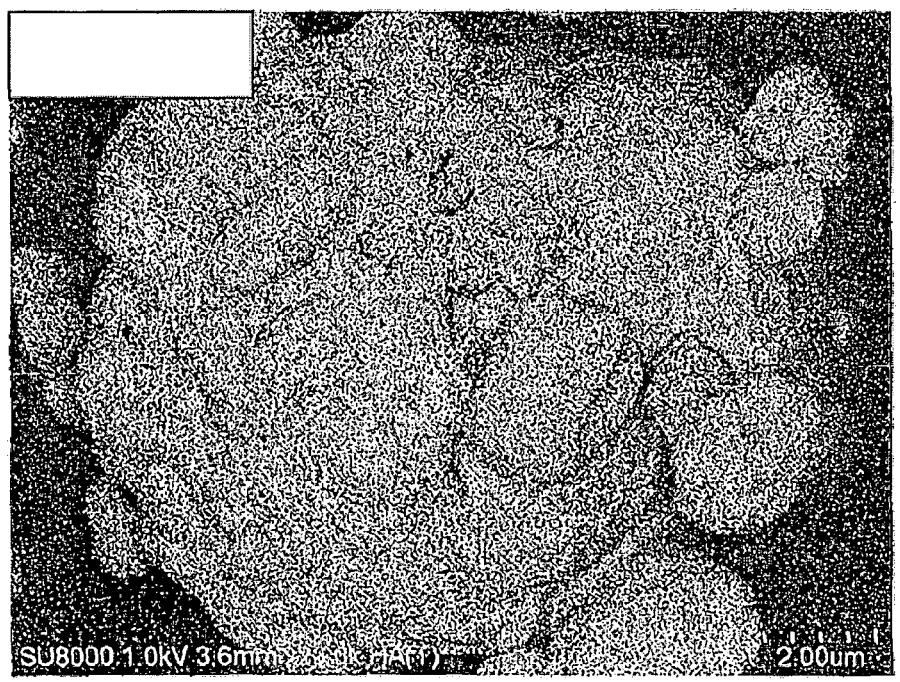
Figure 13A:
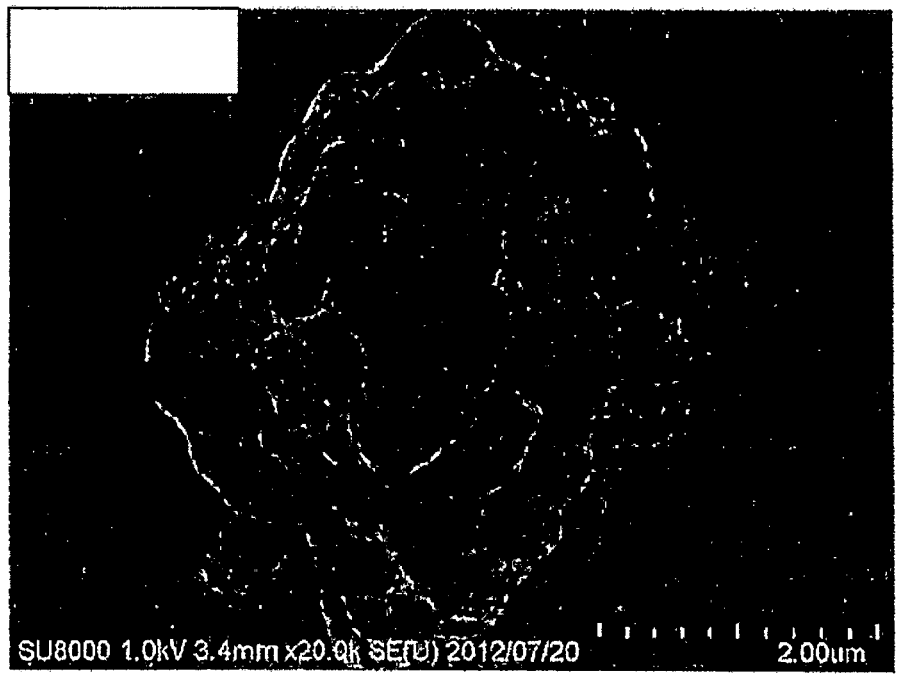
FIG. 13A and FIG. 13B are surface SEM images of a composite active material according to Example 13.
Figure 13B:
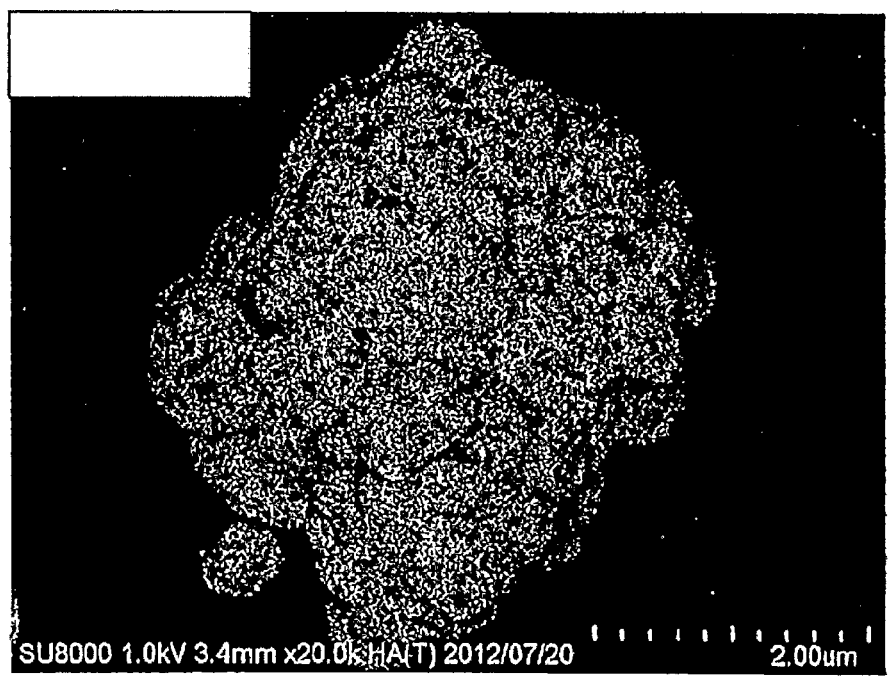

FIG. 1A to FIG. 1D are schematic cross-sectional views of composite active materials according to embodiments of the invention. FIG. 1A to FIG. 1D are views for qualitatively illustrating only a mode in which each material is coated according to the embodiments, and are not always views that quantitatively reflect the coverage and particle diameter of each actual solid electrolyte, the thickness of each solid electrolyte layer, or the like. As shown in FIG. 1A to FIG. 1D, each of composite active materials 100a to 100d includes a composite particle 3 and a sulfide-based solid electrolyte 4. The composite particle 3 is formed such that all or part of the surface of the active material particle 1 is coated with the oxide-based solid electrolyte 2. The sulfide-based solid electrolyte 4 further coats all or part of the surface of the composite particle 3. The dashed lines in FIG. 1A to FIG. 1D each indicate particle boundaries of monocrystal particles in the polycrystal active material particle 1. The continuous line that indicates a boundary between the active material particle 1 and the layer of the oxide-based solid electrolyte 2 indicates an outer periphery of the polycrystal active material particle formed of these mutually bound monocrystal particles. FIG. 1A is a schematic cross-sectional view of the composite active material 100a. The composite active material 100a contains the composite particle 3 and the sulfide-based solid electrolyte 4. The composite particle 3 is formed by coating all the surface of the active material particle 1 with the oxide-based solid electrolyte 2. The sulfide-based solid electrolyte 4 further coats all the surface of the composite particle 3. FIG. 1B is a schematic cross-sectional view of the composite active material 100b. The composite active material 100b contains the composite particle 3 and the sulfide-based solid electrolyte 4. The composite particle 3 is formed by coating part of the surface of the active material particle 1 with the oxide-based solid electrolyte 2. The sulfide-based solid electrolyte 4 further coats all the surface of the composite particle 3. The coverage of the sulfide-based solid electrolyte in each of the composite active materials 100a, 100b is 100%. On the other hand, FIG. 1C is a schematic cross-sectional view of the composite active material 100c. The composite active material 100c contains the composite particle 3 and the sulfide-based solid electrolyte 4. The composite particle 3 is formed by coating all the surface of the active material particle 1 with the oxide-based solid electrolyte 2. The sulfide-based solid electrolyte 4 further coats part of the surface of the composite particle 3. FIG. 1D is a schematic cross-sectional view of the composite active material 100d. The composite active material 100d contains the composite particle 3 and the sulfide-based solid electrolyte 4. The composite particle 3 is formed by coating part of the surface of the active material particle 1 with the oxide-based solid electrolyte 2. The sulfide-based solid electrolyte 4 further coats part of the surface of the composite particle 3. The coverage of the sulfide-based solid electrolyte in each of the composite active materials 100c, 100d is higher than or equal to 76.0%. The composite active material according to the invention includes all the above-described composite active materials 100a to 100d. When a certain amount of composite active material is produced in volume, the same lots may include any one of the composite active materials 100a to 100d or the same lots may mixedly include two or more of the composite active materials 100a to 100d. FIG. 3 shows a cross-sectional SEM image of a composite active material actually obtained through an experiment.

As described above, in the composite active material according to the invention, by adjusting the coverage of the sulfide-based solid electrolyte as needed, it is possible to reduce the internal resistance of the battery that uses the composite active material with respect to the internal resistance of the existing battery.

2. Manufacturing Method for Composite Active Material

A manufacturing method for the composite active material according to the invention includes: a preparation step of preparing composite particles containing active material particles and an oxide-based solid electrolyte, the active material particles containing at least any one of a cobalt element, a nickel element and a manganese element and further containing a lithium element and an oxygen element, the oxide-based solid electrolyte coating all or part of a surface of each of the active material particles; and a coating step of coating a surface of each of the composite particles with a sulfide-based solid electrolyte by mixing the composite particles with the sulfide-based solid electrolyte with application of an energy, at which the sulfide-based solid electrolyte plastically deforms, while a temperature of a mixture of the composite particles and the sulfide-based solid electrolyte is adjusted to 100° C. or below.

The invention includes: (1) the preparation step of preparing the composite particles; and (2) the coating step of coating the surface of each of the composite particles with the sulfide-based solid electrolyte. The invention is not always limited to the above-described two steps only; the invention may, for example, include a pretreatment step, or the like, as will be described later other than the above-described two steps. Hereinafter, the above-described steps (1), (2) and another step will be sequentially described.

2-1. Preparation Step

This step is a step of preparing the above-described composite particles. The active material particles and the oxide-based solid electrolyte, which are the materials of the composite particles, are as described in the chapter of "1-1. Composite Particle". In the invention, the composite particles may be commercially available ones or may be ones prepared as needed. A method of preparing the composite particles may be, for example, a preparation method that uses spray coating as described in JP 2010-073539 A, a rotor fluidized bed coating method, a spraying method, a soaking method, a method that uses a spray drier, or the like.

Figure 16:
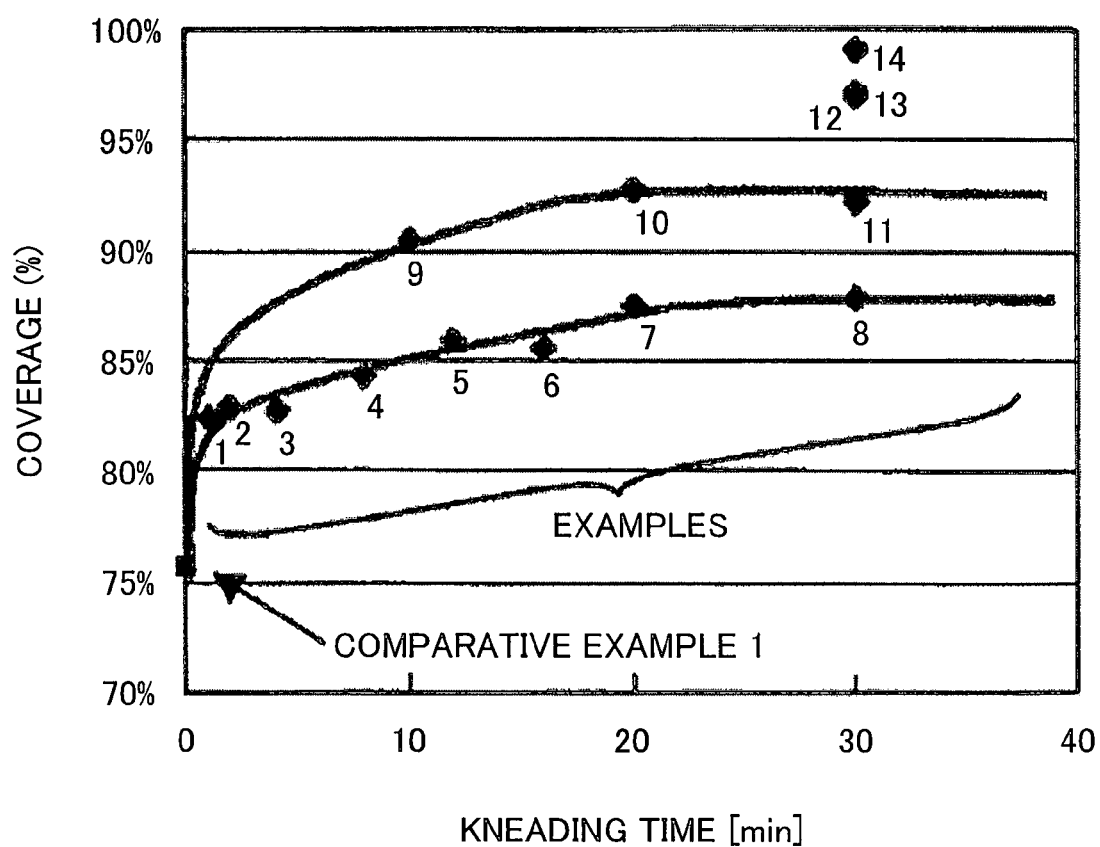
FIG. 16 is a graph that shows the correlation between the coverage of each of composite active materials according to Example 1 to Example 14 and Comparative Example 1 and a kneading time in a coating step.
Figure 20A:
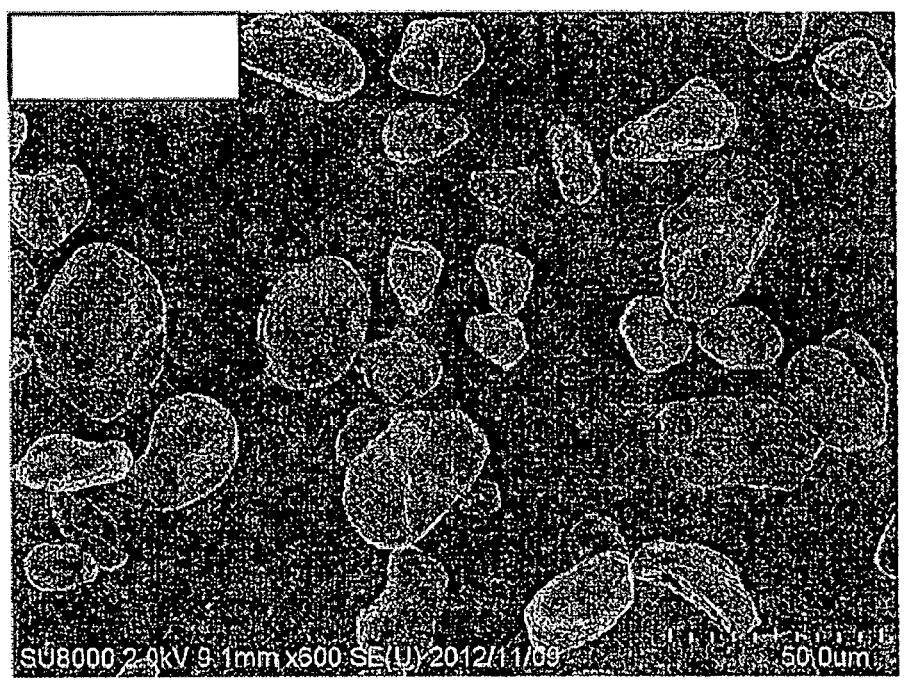
FIG. 20A and FIG. 20B are surface SEM images of natural graphite.
Figure 20B:
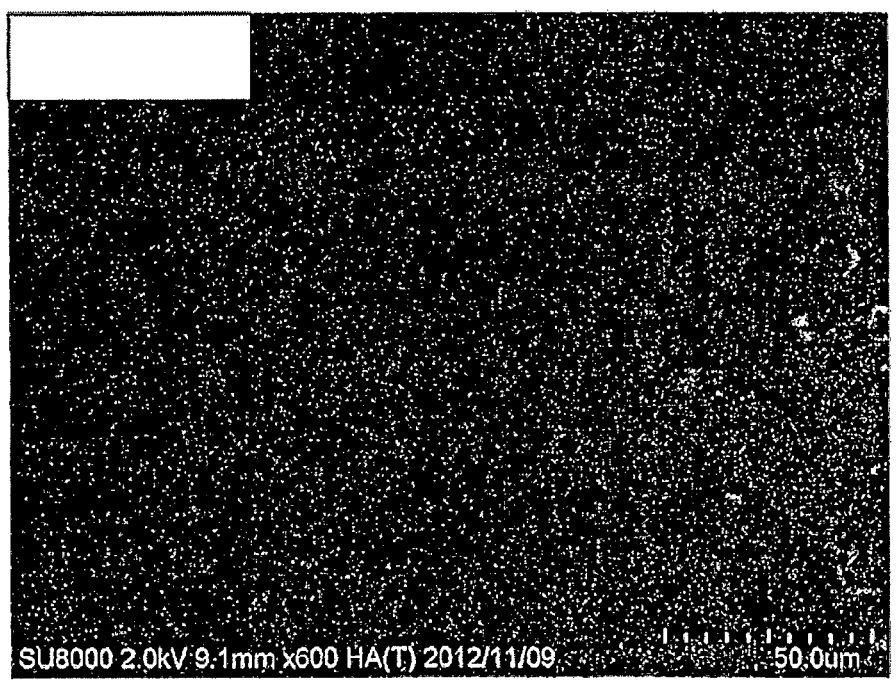

Before a coating step, a pretreatment step of mixing at least one of the composite particles and the sulfide-based solid electrolyte with a compound having an alkyl group may be further provided. By carrying out such a pretreatment step, it is possible to cause the compound having an alkyl group to adhere to the surface of each composite particle and/or the surface of the sulfide-based solid electrolyte. FIG. 16 is a graph that shows the correlation between the coverage of the sulfide-based solid electrolyte in each of the composite active materials according to Example 1 to Example 14 and Comparative Example 1 (described later) and a kneading time in the coating step. FIG. 16 shows an approximate curve of data of the composite active materials according to Example 9 to Example 11 for which no pretreatment step is carried out and the composite active material according to Comparative Example 1 for which no coating step is carried out (that is, the kneading time is 0 minutes). According to the approximate curve, the coverage of the sulfide-based solid electrolyte significantly increases immediately after the start of kneading process (0 to 10 minutes after the start of kneading, particularly, 0 to 1 minute after the start of kneading). Thus, when no pretreatment step is carried out, it is slightly difficult to stably manufacture the composite active material in which the coverage of the sulfide-based solid electrolyte is a relatively low, particularly, the coverage of the sulfide-based solid electrolyte is 80 to 90%. On the other hand, FIG. 16 also shows the approximate curve of data of each of the composite active materials according to Example 1 to Example 8 for which the pretreatment step is carried out and the composite active material according to Comparative Example 1 for which no coating step is carried out (that is, the kneading time is 0 minutes). According to the approximate curve, the coverage of the sulfide-based solid electrolyte relatively gently increases with the kneading time. Thus, when the pretreatment step is carried out, it is possible to stably manufacture the composite active material having a desired coverage of the sulfide-based solid electrolyte, that is, from the composite active material having a relatively low coverage, particularly, a coverage of 80 to 90%, to the composite active material having a relatively high coverage. The reason why the coverage of the sulfide-based solid electrolyte relatively gently increases with the kneading time by carrying out the pretreatment step in this way is presumably that a surface free energy decreases due to modification of the surfaces of the sulfide-based solid electrolyte and composite particles by the alkyl group, with the result that energy becomes hard to be applied to the sulfide-based solid electrolyte and, therefore, the sulfide-based solid electrolyte becomes hard to coat the composite particles.

The compound having an alkyl group that is used in the pretreatment step is not specifically limited as long as an alkyl group-containing compound that decreases adhesion at the interfaces of the composite particles and/or the sulfide-based solid electrolyte, that is, an alkyl group-containing compound that reduces the surface free energy in these materials. An example of the compound having an alkyl group may be an alkylamine, such as trimethylamine $((CH_3)_3N)$, triethylamine $((C_2H_5)_3N)$, tripropylamine $((C_3H_7)_3N)$ and tributylamine $((C_4H_9)_3N)$; an ether compound, such as ethyl ether $((C_2H_5)_2O)$, propyl ether (($C_3H_7$)$_2$O) and butyl ether (($C_4H_9$)$_2$O); a nitrile compound, such as butyl nitrile ($C_4H_9CN$), pentyl nitrile ($C_5H_{11}CN$) and isopropyl nitrile (i-$C_3H_7CN$); an ester compound, such as butyl acetate ($C_2H_5CO_2C_4H_9$), butyl butyrate ($C_4H_9CO_2C_4H_9$) and ethyl butyrate ($C_4H_9CO_2C_2H_5$); an aromatic compound, such as benzene ($C_6H_6$), xylene ($C_8H_{10}$) and toluene ($C_7H_8$); or the like. Among these compounds, an alkylamine is more desirably used in the pretreatment step.

A mixing method in the pretreatment step is more desirably wet mixing that uses a dispersion medium in terms of uniformly causing the compound having an alkyl group to adhere to the surface of each composite particle and/or the surface of the sulfide-based solid electrolyte. An example of the dispersion medium that may be used in wet mixing may be an alkane, such as n-hexane ($C_6H_{14}$), n-heptane ($C_7H_{16}$) and n-octane ($C_8H_{18}$); an ether compound, such as ethyl ether (($C_2H_5$)$_2$O), propyl ether (($C_3H_7$)$_2$O) and butyl ether (($C_4H_9$)$_2$O); a nitrile compound, such as butyl nitrile ($C_4H_9CN$), pentyl nitrile ($C_5H_{11}CN$) and isopropyl nitrile (i-$C_3H_7CN$); an ester compound, such as butyl acetate ($C_2H_5CO_2C_4H_9$); butyl butyrate ($C_4H_9CO_2C_4H_9$) and ethyl butyrate ($C_4H_9CO_2C_2H_5$); an aromatic compound, such as benzene ($C_6H_6$), xylene ($C_8H_{10}$) and toluene ($C_7H_8$); or the like. These dispersion media may be used solely or may be used in combination of two or more of them. When wet mixing is performed, a mixture after the wet mixing may be dried by appropriately heating the mixture to remove the dispersion medium.

Hereinafter, an example of the pretreatment step will be described. First, the composite particles, the sulfide-based solid electrolyte, the compound having an alkyl group and the appropriate dispersion medium are mixed. At this time, the materials may be highly dispersed in the dispersion medium by irradiating ultrasonic to the mixture. Subsequently, the obtained mixture is heated under the temperature condition of 80 to 120° C. for 1 to 5 hours to be dried. The dried mixture is used in the following coating step.

2-2. Coating Step

This step is a step of coating the surface of each of the composite particles with the sulfide-based solid electrolyte by mixing the composite particles with the sulfide-based solid electrolyte with application of an energy, at which the sulfide-based solid electrolyte plastically deforms, while the temperature of the mixture is adjusted to 100° C. or below. The sulfide-based solid electrolyte that is used in this step is as described in the chapter of "1-2. Sulfide-based Solid Electrolyte".

In this step, sulfide-based solid electrolyte particles having a mean particle diameter of 1 μm or smaller are desirably used as the sulfide-based solid electrolyte. As shown in Table 1 (described later), in the composite active materials according to Example 12 and Example 13, manufactured by using the sulfide-based solid electrolyte particles having a mean particle diameter of 1 μm or smaller, the coverage of the sulfide-based solid electrolyte is higher by 4% or more than that of each of the composite active materials according to Example 10 and Example 11, manufactured by using the sulfide-based solid electrolyte particles having a mean particle diameter larger than 1 μm. This is presumably because, as the mean particle diameter of the sulfide-based solid electrolyte particles reduces, the surface of each of the composite particles is easily completely coated with the sulfide-based solid electrolyte particles without any gap. In this way, it is possible to further improve the coverage of the sulfide-based solid electrolyte by using the sulfide-based solid electrolyte having a smaller mean particle diameter, with the result that it is possible to suppress the reaction resistance of a lithium secondary battery that uses the above composite active material to a lesser degree. An example that exhibits such a significantly high coverage by directly utilizing small particles of the sulfide-based solid electrolyte for coating other particles is not known in the existing technique. The mean particle diameter of the sulfide-based solid electrolyte particles that are used in the invention is more desirably smaller than or equal to 0.9 μm and further desirably smaller than or equal to 0.8 μm. The mean particle diameter is desirably larger than or equal to 0.01 μm.

An additive amount of the sulfide-based solid electrolyte to the composite particles is desirably an additive amount such that the mean thickness of the sulfide-based solid electrolyte layer, described in the chapter of "1-2. Sulfide-based Solid Electrolyte", is obtained. Specifically, it is desirable to add 5 to 25 mass parts of the sulfide-based solid electrolyte to the 100 mass parts of the composite particles, and it is more desirable to add 8 to 22 mass parts of the sulfide-based solid electrolyte to the 100 mass parts of the composite particles.

In this step, the composite particles and the sulfide-based solid electrolyte are mixed while the temperature of the mixture is adjusted to 1.00° C. or below. When the temperature of the mixture exceeds 100° C., the sulfide-based solid electrolyte alters due to heat, so a desired composite active material is not obtained. By suppressing the mixing temperature to 100° C. or below, it is possible, to avoid thermal damage at the time of manufacturing and to manufacture the composite active material in which the coverage of the sulfide-based solid electrolyte on the surfaces of the composite particles is higher than or equal to 76.0%. The temperature of the mixture in the coating step is desirably lower than or equal to 90° C. and more desirably lower than or equal to 80° C.

In this step, the composite particles and the sulfide-based solid electrolyte are mixed with application of an energy at which the sulfide-based solid electrolyte plastically deforms. Plastic deformation of the sulfide-based solid electrolyte in the invention is that the sulfide-based solid electrolyte cannot keep its original shape in the initial stage of the coating step and is fluidized irreversibly. At this time, chemical bonds between atoms that compose the sulfide-based solid electrolyte are not cleaved or the composition of the sulfide-based solid electrolyte is not altered. Particularly, when the particles of the sulfide-based solid electrolyte are used as a raw material, plastic deformation in the invention is that the shape of each of the sulfide-based solid electrolyte particles collapses and, as a result, any adjacent sulfide-based solid electrolyte particles mix with each other and all or part of grain boundaries between the particles disappear.

An example of the energy at which the sulfide-based solid electrolyte plastically deforms may be an energy that is applied to the sulfide-based solid electrolyte such that the sulfide-based solid electrolyte yields, a fracture energy that is applied to the sulfide-based solid electrolyte up to a fracture of the sulfide-based solid electrolyte, a (physical) strain energy that is stored in the sulfide-based solid electrolyte until the shape of the sulfide-based solid electrolyte strains, or the like. Hereinafter, the energy at which the sulfide-based solid electrolyte plastically deforms will be further described in terms of yield. An example of the energy at which the sulfide-based solid electrolyte plastically deforms may be an energy at which stress reaches an upper yield point during yielding when a so-called stress-strain diagram is plotted where the ordinate axis represents stress a (N/mm$^2$) and the abscissa axis represents strain (%). An example of an energy at which the sulfide-based solid electrolyte plastically deforms in the stress-strain diagram in which an upper yield point is not clearly recognized may be an energy at which proof stress (that is, stress at the time when a plastic strain left after unloading is 0.2%) is applied to the sulfide-based solid electrolyte. The stress-strain diagram of the sulfide-based solid electrolyte is obtained by a method according to JISK7181, particularly, by plotting "10.1 Compressive Stress" and "10.2 Compressive Strain" at least measured in accordance with "9 Procedure" of the standard with the use of "5 Device" and "6 Specimen" of the standard.

In the coating step, it is desirable to add shear force to the mixture of the composite particles and the sulfide-based solid electrolyte so as to apply the above-described plastically-deforming energy. An example of a method of adding shear force so as to apply the plastically-deforming energy may be a mechanical kneading method that applies frictional shear energy to the mixture in a dry system between a rotating rotor and a wall surface. An example of a device that is able to achieve such a mechanical kneading method may be a dry kneading machine that does not use a medium. The dry kneading machine that may be used in the invention is not specifically limited as long as the dry kneading machine is generally used, and may be, for example, Nobilta (product name, produced by Hosokawa Micron Corporation), mechanofusion, hybridization, COMPOSI (product name, produced by Nippon Coke & Engineering Company, Limited), or the like. By employing these dry kneading machines that do not use a medium, it is possible to reduce mechanical damage to the active material particles in comparison with the case where a kneading machine that uses a medium, such as a planetary ball mill, is used. A specific condition under which the plastically-deforming energy is applied with the use of the dry kneading machine may be, for example, a condition that the blade-to-wall clearance is 0.1 to 8 mm and the rotation speed is 500 to 5,000 rpm. The dry kneading machine is generally used for the purposes of mixing relatively hard materials with each other. In the invention, the sulfide-based solid electrolyte that is a relatively soft material is used, so it is possible to apply a sufficient energy for plastically deforming the sulfide-based solid electrolyte even when a relatively low rotation speed is employed in the dry kneading machine.

In the coating step, it is desirable that the sulfide-based solid electrolyte be further added to a mixture after mixing for 10 minutes or longer and be mixed with application of an energy, at which the sulfide-based solid electrolyte plastically deforms, while the temperature of the mixture is adjusted to 100° C. or below. By additionally mixing the sulfide-based solid electrolyte in the coating step in this way, a composite active material having a significantly high coverage of the sulfide-based solid electrolyte on the composite particles as shown in Example 14 (described later) is obtained. FIG. 17 is a graph that shows the correlation between the coverage of the sulfide-based solid electrolyte in each of the composite active materials according to Example 4, and the like, and the reaction resistance of each of lithium secondary batteries that use those composite active materials. According to FIG. 17, it appears that the reaction resistance of the lithium secondary battery is minimum in the case where the coverage of the sulfide-based solid electrolyte is 93%. However, when the type or additive amount different from those of Example 4, and the like, is employed for another electrode material, such as an electrically conductive material, the coverage of the sulfide-based solid electrolyte at which the resistance of the lithium secondary battery is the lowest may shift to a point higher than 93%. In such a case as well, by employing a method of additionally mixing the sulfide-based solid electrolyte in the coating step, it is possible to improve the coverage of the sulfide-based solid electrolyte and to suppress the reaction resistance of the lithium secondary battery that uses the composite active material to a lesser degree. The number of times the sulfide-based solid electrolyte is added to the mixture is desirably 1 to 10 times and more desirably 1 to 5 times.

Hereinafter, an example in which the coating step is carried out after the pretreatment step will be described as one example of the coating step. Initially, precursor powder after being subjected to the pretreatment step is put into the dry kneading machine. Subsequently, the composite active material according to the invention is obtained by carrying out kneading process for 30 seconds to 3 hours under the condition that the blade-to-wall clearance is 0.1 to 8 mm and the rotation speed is 500 to 5,000 rpm while the temperature of the mixture is adjusted to 100° C. or below.

Hereinafter, an example in which the coating step is carried out without carrying out the pretreatment step will be described as one example of the coating step. Initially, the composite particles and the sulfide-based solid electrolyte are put into the dry kneading machine. Subsequently, the composite active material according to the invention is obtained by carrying out kneading process for 30 seconds to 3 hours under the condition that the blade-to-wall clearance is 0.1 to 8 mm and the rotation speed is 500 to 5,000 rpm while the temperature of the mixture is adjusted to 100° C. or below. A dry synthesis that does not include the pretreatment step in this way does not require a dispersion medium, or the like, so it is advantageous that the cost is reduced.

Hereinafter, an example in which the sulfide-based solid electrolyte is additionally mixed in the coating step will be described as one example of the coating step. Initially, the composite particles and part of the sulfide-based solid electrolyte are put into the dry kneading machine. Subsequently, kneading process is carried out for 30 seconds to 3 hours under the condition that the blade-to-wall clearance is 0.1 to 8 mm and the rotation speed is 500 to 5,000 rpm while the temperature of the mixture is adjusted to 100° C. or below. Subsequently, the other part of the sulfide-based solid electrolyte is put into the dry kneading machine, and kneading process is carried out under the above-described condition. In this way, the composite active material according to the invention is obtained by alternately carrying out addition of the sulfide-based solid electrolyte and the kneading process.

With the manufacturing method according to the invention, it is possible to plastically deform the sulfide-based solid electrolyte without causing thermal damage to the sulfide-based solid electrolyte. Therefore, it is possible to manufacture the composite active material having a higher coverage of the sulfide-based solid electrolyte on the composite particles than that of the composite active material that is manufactured in accordance with the existing technique.

3. Lithium Secondary Battery

The lithium secondary battery according to the invention is a lithium secondary battery that includes a positive electrode, a negative electrode and an electrolyte layer interposed between the positive electrode and the negative electrode. At least one of the positive electrode and the negative electrode contains at least one of the above-described composite active materials and the composite active materials manufactured in accordance with the above-described methods. Because the lithium secondary battery according to the invention contains the above-described composite active material in which 76.0% or more of the surface of each of the composite particles is coated with the sulfide-based solid electrolyte, the lithium secondary battery is able to suppress the reaction resistance to a lesser degree as compared to the existing lithium secondary battery. The reaction resistance of the lithium secondary battery according to the invention may be, for example, obtained from a circular arc component in the Nyquist diagram obtained through a high-frequency impedance method.

Figure 2:
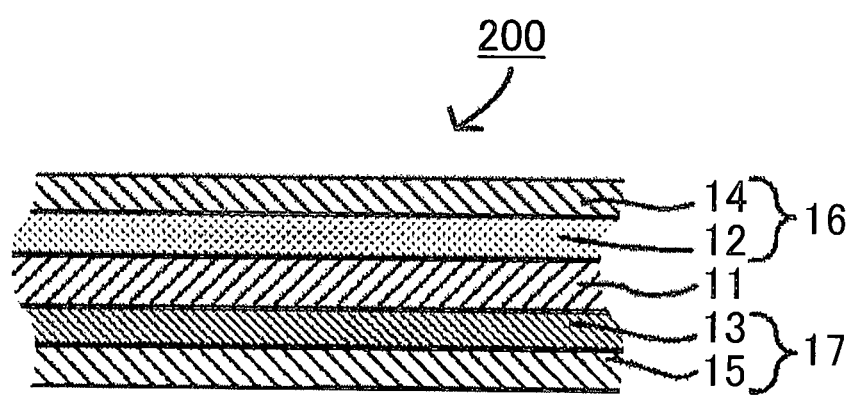
FIG. 2 is a view that shows an example of the layer configuration of a lithium secondary battery according to the invention, and is a view that schematically shows the cross section taken in a laminated direction.

FIG. 2 is a view that shows an example of the layer configuration of the lithium secondary battery according to the invention and is a view that schematically shows a cross section taken in a laminated direction. The lithium secondary battery according to the invention is not always limited to this example only. The lithium secondary battery 200 includes a positive electrode 16, a negative electrode 17 and an electrolyte layer 11. The positive electrode 16 includes a positive electrode active material layer 12 and a positive electrode current collector 14. The negative electrode 17 includes a negative electrode active material layer 13 and a negative electrode current collector 15. The electrolyte layer 11 is held between the positive electrode 16 and the negative electrode 17. Hereinafter, the positive electrode, the negative electrode and the electrolyte layer that are used in the lithium secondary battery according to the invention and a separator and a battery case that are suitably used in the lithium secondary battery according to the invention will be described in detail.

The positive electrode that is used in the invention desirably includes the positive electrode active material layer that contains the above-described composite active material, and generally further includes the positive electrode current collector and a positive electrode lead connected to the positive electrode current collector.

The positive electrode active material may be only the above-described composite active material according to the invention solely or a combination of the composite active material and another one or two or more positive electrode active materials. An example of another positive electrode active material may be specifically $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$, $Li_3V_2(PO_4)_3$, or the like. The surfaces of fine particles made of the positive electrode active material may be coated with $LiNbO_3$, or the like. The total content of the positive electrode active material in the positive electrode active material layer generally falls within the range of 50 to 90 percent by weight.

Although the thickness of the positive electrode active material layer that is used in the invention varies with, for example, the intended application purpose of the lithium secondary battery, the thickness of the positive electrode active material layer desirably falls within the range of 10 to 250 μm, more desirably falls within the range of 20 to 200 μm, and particularly most desirably falls within the range of 30 to 150 μm.

The positive electrode active material layer may contain an electrically conductive material, a binder, or the like, where necessary. The electrically conductive material that is used in the invention is not specifically limited as long as the electrically conductive material is able to improve the electrical conductivity of the positive electrode active material layer, and may be, for example, carbon black, such as acetylene black and Ketjen black. The content of the electrically conductive material in the positive electrode active material layer varies with the type of the electrically conductive material, and generally falls within the range of 1 to 30 percent by weight.

An example of the binder that is used in the invention may be, polyvinylidene fluoride (PVdF), polytetrafluoroethylene (PTFE), or the like. The content of the binder in the positive electrode active material layer should be an amount by which the positive electrode active material, and the like, are fixed, and is desirably smaller. The content of the binder generally falls within the range of 1 to 10 percent by weight. A dispersion medium, such as N-methyl-2-pyrrolidone and acetone, may be used to prepare the positive electrode active material.

The positive electrode current collector that is used in the invention has the function of collecting current in the positive electrode active material layer. An example of the material of the above-described positive electrode current collector may be aluminum, SUS, nickel, iron, titanium, or the like. Among others, the material of the above-described positive electrode current collector is desirably aluminum or SUS. An example of the shape of the positive electrode current collector may be a foil shape, a sheet shape, a mesh shape, or the like. Among others, the shape of the positive electrode current collector is desirably a foil shape.

A method of manufacturing the positive electrode that is used in the invention is not specifically limited as long as it is possible to obtain the above-described positive electrode. After the positive electrode active material layer is formed, the positive electrode active material layer may be pressed in order to improve the electrode density.

The negative electrode that is used in the invention desirably includes the negative electrode active material layer that contains the above-described composite active material, and generally further includes the negative electrode current collector and a negative electrode lead connected to the negative electrode current collector.

The negative electrode active material may be only the above-described composite active material according to the invention solely or a combination of the composite active material and another one or two or more negative electrode active materials. Another negative electrode active material is not specifically limited as long as the negative electrode active material is able to occlude and/or emit lithium ions. An example of another negative electrode active material may be a lithium metal, a lithium alloy, a metal oxide that contains a lithium element, a metal sulfide that contains a lithium element, a metal nitride that contains a lithium element, a carbon material, such as graphite, or the like. The negative electrode active material may be in a powder form or may be in a thin film form. An example of the lithium alloy may be a lithium-aluminum alloy, a lithium-tin alloy, a lithium-lead alloy, a lithium-silicon alloy, or the like. An example of the metal oxide that contains a lithium element may be a lithium titanium oxide, or the like. An example of a metal nitride that contains a lithium element may be a lithium cobalt nitride, a lithium iron nitride, a lithium manganese nitride, or the like. The negative electrode active material may also be lithium coated with a solid electrolyte.

The above-described negative electrode active material layer may contain only the negative electrode active material or may contain at least one of an electrically conductive material and a binder in addition to the negative electrode active material. For example, when the negative electrode active material is in a foil form, the negative electrode active material layer may be formed to contain only the negative electrode active material. On the other hand, when the negative electrode active material is in a powder form, the negative electrode active material layer may be formed to include the negative electrode active material and the binder. The electrically conductive material and the binder are respectively similar to the electrically conductive material and the binder contained in the above-described positive electrode active material layer, so the description thereof is omitted here. The film thickness of the negative electrode active material layer is not specifically limited. For example, the film thickness desirably falls within the range of 10 to 100 μm, and more desirably falls within the range of 10 to 50 μm.

The electrode active material layer of at least one of the above-described positive electrode and the above-described negative electrode may be configured to contain at least an electrode active material and an electrode electrolyte. In this case, the electrode electrolyte may be a solid electrolyte, such as a solid oxide electrolyte and a solid sulfide electrolyte (described later), a gel electrolyte, or the like.

The material of the negative electrode current collector may be similar to the material of the above-described positive electrode current collector. A similar shape to the shape of the above-described positive electrode current collector may be employed as the shape of the negative electrode current collector.

A method of manufacturing the negative electrode that is used in the invention is not specifically limited as long as the above-described negative electrode is obtained by the method. After the negative electrode active material layer is formed, the negative electrode active material layer may be pressed in order to improve the electrode density.

The electrolyte layer that is used in the invention is held between the positive electrode and the negative electrode, and has the function of exchanging lithium ions between the positive electrode and the negative electrode. The electrolyte layer may be an electrolytic solution, a gel electrolyte, a solid electrolyte, or the like. Only one of them may be used solely or two or more of them may be used in combination.

The electrolytic solution may be a nonaqueous electrolytic solution or an aqueous electrolytic solution. The nonaqueous electrolytic solution generally contains a lithium salt and a nonaqueous solvent. An example of the above-described lithium salt may be a nonorganic lithium salt, such as $LiPF_6$, $LiBF_4$, $LiClO_4$ and $LiAsF_6$; an organic lithium salt, such as $LiCF_3SO_3$, $LiN(SO_2CF_3)_2$(Li-TFSA), $LiN(SO_2C_2F_5)_2$ and $LiC(SO_2CF_3)_3$, or the like. An example of the above-described nonaqueous solvent may be ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethyl sulfoxide (DMSO), a mixture of them, or the like. The concentration of the lithium salt in the nonaqueous electrolytic solution is, for example, 0.5 to 3 mol/kg.

In the invention, an example of the nonaqueous electrolytic solution or the nonaqueous solvent may be an ionic liquid, or the like. An example of the ionic liquid may be N-methyl-N-propyl piperidinium bis(trifluoromethanesulfonyl)amide (PP13TFSA), N-methyl-N-propyl pyrrolidinium bis(trifluoromethanesulfonyl)amide (P13TFSA), N-butyl-N-methyl pyrrolidinium bis(trifluoromethanesulfonyl)amide (P14TFSA), N,N-diethyl-N-methyl-N-(2-methoxyethyl) ammonium bis(trifluoromethanesulfonyl)amide (DEMETFSA), N,N,N-trimethyl-N-propyl ammonium bis(trifluoromethanesulfonyl)amide (TMPATFSA), or the like.

The aqueous electrolytic solution generally contains a lithium salt and water. An example of the lithium salt may be a lithium salt, such as LiOH, LiCl, $LiNO_3$ and $CH_3CO_2Li$, or the like.

The gel electrolyte that is used in the invention is generally gelled by adding a polymer to a nonaqueous electrolytic solution. An example of the nonaqueous gel electrolyte is obtained by gelling the above-described nonaqueous electrolytic solution through addition of a polymer, such as polyethylene oxide (PEO), polyacrylonitrile (PAN), polymethyl methacrylate (PMMA), polyurethane, polyacrylate and/or cellulose, to the nonaqueous electrolytic solution. In the invention, an $LiTFSA(LiN(CF_3SO_2)_2)$-PEO-based nonaqueous gel electrolyte is desirable.

The solid electrolyte may be an oxide-based solid electrolyte, a sulfide-based solid electrolyte, a polymer electrolyte, or the like. Of these solid electrolytes, a specific example of the oxide-based solid electrolyte is the one as described in the chapter of "1-1. Composite Particles", and a specific example of the sulfide-based solid electrolyte is the one as described in the chapter of "1-2. Sulfide-based Solid Electrolyte". The polymer electrolyte generally contains a lithium salt and a polymer. The lithium salt may be at least one of the above-described nonorganic lithium salts and organic lithium salts. The polymer is not specifically limited as long as the polymer forms a complex with the lithium salt, and may be, for example, polyethylene oxide, or the like.

The lithium secondary battery according to the invention may include a separator, impregnated with an electrolytic solution, between the positive electrode and the negative electrode. An example of the above-described separator may be a porous film, such as polyethylene and polypropylene; a nonwoven fabric, such as a resin nonwoven fabric and a glass fiber nonwoven fabric, or the like.

The lithium secondary battery according to the invention generally includes a battery case that accommodates the above-described positive electrode, negative electrode, electrolyte layer, and the like. The shape of the battery case may be specifically a coin shape, a flat sheet shape, a cylindrical shape, a laminated shape, or the like.

Hereinafter, the invention will be further specifically described by way of examples; however, the invention is not limited to the examples only.

1. Manufacturing of Composite Active Material

EXAMPLE 1

Initially, composite particles in which $LiNi_{1/3}Co_{1/3}Mn_{1/3}O_2$ particles (active material particles) are coated with $LiNbO_3$ (oxide-based solid electrolyte) were prepared (preparation step). The mean particle diameter of the composite particles was 4.5 μm. Subsequently, 50 g of the composite particles, 10.8 g of $48.5Li_2S-17.5P_2S_5-4Li_2O-30LiI$ particles (sulfide-based solid electrolyte, mean particle diameter: 1.5 μm), 9 g of tributylamine $((C_4H_9)_3N)$ that is a compound having an alkyl group, and 75 g of heptane $(C_7H_{16})$ that is a dispersion medium were mixed in a wet state, and further subjected to ultrasonic dispersion. A slurry after ultrasonic dispersion was heated for 2 hours under the temperature condition of 100° C., and precursor powder was obtained (pretreatment step). Subsequently, the precursor powder was put into the dry kneading machine (produced by Hosokawa Micron Corporation, product name: NOB-MINI), and was subjected to kneading process for 1 minute under the condition that the blade-to-wall clearance is 1 mm and the rotation speed is 3,000 rpm while the temperature of the mixture was adjusted to 50° C. (coating step). Thus, the composite active material according to Example 1 was manufactured.

EXAMPLE 2

The composite active material according to Example 2 was manufactured as in the case of Example 1 except that the kneading time in the coating step was changed from 1 minute to 2 minutes in Example 1.

EXAMPLE 3

The composite active material according to Example 3 was manufactured as in the case of Example 1 except that the kneading time in the coating step was changed from 1 minute to 4 minutes in Example 1.

EXAMPLE 4

The composite active material according to Example 4 was manufactured as in the case of Example 1 except that the kneading time in the coating step was changed from 1 minute to 8 minutes in Example 1.

EXAMPLE 5

The composite active material according to Example 5 was manufactured as in the case of Example 1 except that the kneading time in the coating step was changed from 1 minute to 12 minutes in Example 1.

EXAMPLE 6

The composite active material according to Example 6 was manufactured as in the case of Example 1 except that the kneading time in the coating step was changed from 1 minute to 16 minutes in Example 1.

EXAMPLE 7

The composite active material according to Example 7 was manufactured as in the case of Example 1 except that the kneading time in the coating step was changed from 1 minute to 20 minutes in Example 1.

EXAMPLE 8

The composite active material according to Example 8 was manufactured as in the case of Example 1 except that the kneading time in the coating step was changed from 1 minute to 30 minutes in Example 1.

EXAMPLE 9

Initially, composite particles in which $LiNi_{1/3}Co_{1/3}Mn_{1/3}O_2$ particles (active material particles) are coated with $LiNbO_3$ (oxide-based solid electrolyte) were prepared (preparation step). The mean particle diameter of the composite particles was 4.5 µm. Subsequently, 50 g of the composite particles and 10.8 g of $48.5Li_2S-17.5P_2S_5-4Li_2O-30LiI$ particles (sulfide-based solid electrolyte, mean particle diameter: 1.5 µm) were put into the dry kneading machine (produced by Hosokawa Micron' Corporation, product name: NOB-MINI), and were subjected to kneading process for 10 minutes under the condition that the blade-to-wall clearance is 1 mm and the rotation speed is 3,000 rpm while the temperature of the mixture was adjusted to 50° C. (coating step). Thus, the composite active material according to Example 9 was manufactured.

EXAMPLE 10

The composite active material according to Example 10 was manufactured as in the case of Example 9 except that the kneading time in the coating step was changed from 10 minutes to 20 minutes in Example 9.

EXAMPLE 11

The composite active material according to Example 11 was manufactured as in the case of Example 9 except that the kneading time in the coating step was changed from 10 minutes to 30 minutes in Example 9.

EXAMPLE 12

The composite active material according to Example 12 was manufactured as in the case of Example 9 except that 10.8 g of $48.5Li_2S-17.5P_2S_5-4Li_2O-30LiI$ particles (mean particle diameter: 0.8 µm) were used instead of 10.8 g of $48.5Li_2S-17.5P_2S_5-4Li_2O-30LiI$ particles (mean particle diameter: 1.5 µm) and the kneading time in the coating step was changed from 10 minutes to 30 minutes in Example 9.

EXAMPLE 13

The composite active material according to Example 13 was manufactured as in the case of Example 9 except that 10.8 g of $48.5 Li_2S-17.5P_2S_5-4Li_2O-30LiI$ particles (mean particle diameter: 0.8 µm) were used instead of 10.8 g of $48.5Li_2S-17.5P_2S_5-4Li_2O-30LiI$ particles (mean particle diameter: 1.5 µm) and the kneading time in the coating step was changed from 10 minutes to 30 minutes in Example 9.

EXAMPLE 14

Initially, composite particles in which $LiNi_{1/3}Co_{1/3}Mn_{1/3}O_2$ particles (active material particles) are coated with $LiNbO_3$ (oxide-based solid electrolyte) were prepared (preparation step). The mean particle diameter of the composite particles was 4.5 µm. Subsequently, 50 g of the composite particles and 3.5 g of $48.5Li_2S-17.5P_2S_5-4Li_2O-30LiI$ particles (sulfide-based solid electrolyte, mean particle diameter: 0.8 µm) were put into the dry kneading machine (produced by Hosokawa Micron Corporation, product name: NOB-MINI), and were subjected to kneading process for 10 minutes under the condition that the blade-to-wall clearance is 1 mm and the rotation speed is 3,000 rpm while the temperature of the mixture was adjusted to 50° C. ((first) coating step). Subsequently, 3.5 g of $48.5Li_2S-17.5P_2S_5-4Li_2O-30LiI$ particles (sulfide-based solid electrolyte, mean particle diameter: 0.8 µm) were further added into the dry kneading machine after the (first) coating step, and were subjected to kneading process for 10 minutes under a similar condition to that of the (first) coating step ((second) coating step). Subsequently, 3.8 g of $48.5Li_2S-17.5P_2S_5-4Li_2O-30LiI$ particles (sulfide-based solid electrolyte, mean particle diameter: 0.8 µm) were further added into the dry kneading machine after the (second) coating step, and were subjected to kneading process for 40 minutes under a similar condition to that of the (first) coating step ((third) coating step). Thus, the composite active material was manufactured.

Reference Example 1

24 g of natural graphite particles (active material particles, mean particle diameter: 20 μm) and 10.4 g of 48.5Li$_2$S-17.5P$_2$S$_5$:4Li$_2$O-30LiI particles (sulfide-based solid electrolyte, mean particle diameter: 0.8 μm) were put into the dry kneading machine (produced by Hosokawa Micron Corporation, product name: NOB-MINI), and were subjected to kneading process for 60 minutes under the condition that the blade-to-wall clearance is 1 mm and the rotation speed is 3,000 rpm while the temperature of the mixture was adjusted to 50° C. (coating step). Thus, the composite active material according to Reference Example 1 was manufactured.

Comparative Example 1

Initially, composite particles in which LiNi$_{1/3}$Co$_{1/3}$Mn$_{1/3}$O$_2$ particles (active material particles) are coated with LiNbO$_3$ (oxide-based solid electrolyte) were prepared (preparation step). The mean particle diameter of the composite particles was 4.5 μm, Subsequently, 50 g of the composite particles and 10.8 g of 48.5Li$_2$S-17.5P$_2$S$_5$-4Li$_2$O-30LiI particles (sulfide-based solid electrolyte, mean particle diameter: 1.5 μm), 9 g of tributylamine ((C$_4$H$_9$)$_3$N) that is a compound having an alkyl group, and 75 g of heptane (C$_7$H$_{16}$) that is a dispersion medium were mixed in a wet state, and further subjected to ultrasonic dispersion. Thus, the composite active material according to Comparative Example 1 was manufactured. That is, in Comparative Example 1, neither heating after ultrasonic dispersion nor the coating step in the invention was carried out.

2. Morphology Observation of Composite Active Material
2-1. Cross-Sectional Morphology Observation by SEM The composite active material according to Example 13 was subjected to cross section polisher (CP) treatment, and the cross-sectional morphology of the composite active material was observed with the use of SEM. The details of measurement are as follows.

SEM: Produced by Hitachi High-technologies Corporation, product number SU8030
Accelerating Voltage: 1 kV
Emission Current: 10 μA
Magnification: 20,000

FIG. 3 is a cross-sectional SEM image of the composite active material according to Example 13. As is apparent from FIG. 3, inside the composite active material according to Example 13, LiNi$_{1/3}$Co$_{1/3}$Mn$_{1/3}$O$_2$ particles that are active material particles are bound to each other, and a polycrystal active material particle 21 is formed. As is apparent from FIG. 3, the thus configured polycrystal active material particle 21 is coated with an oxide-based solid electrolyte layer 22 having a mean thickness of 10 nm, and the surface of the oxide-based solid electrolyte layer 22 was further coated with a sulfide-based solid electrolyte layer 23 having a mean thickness of 200 nm. In this way, it appears that the composite active material according to Example 13 includes the oxide-based solid electrolyte layer and the sulfide-based solid electrolyte layer significantly thinner than the particle diameter of the composite active material.

2-2. Surface Morphology Observation by SEM

The surface morphologies of the composite active materials according to Example 1 to Example 14, and Comparative Example 1 and the surface morphology of natural graphite according to Reference Example 1 were observed by SEM by using samples on which the composite active materials and the natural graphite were sprayed in a powder form. The morphology of each of the composite active materials was evaluated on the basis of the obtained corresponding secondary electron image, and a coated state of the sulfide-based solid electrolyte in each of the composite active materials was evaluated on the basis of a contrast difference in the corresponding reflection electron image. A measurement condition for surface morphology observation is the same as the measurement condition for the above-described cross-sectional morphology observation.

FIG. 4A to FIG. 15B and FIG. 19A to FIG. 20B are the surface SEM images of the composite active materials according to Example 1 to Example 4, Example 8 to Example 14 and Comparative Example 1 and the surface SEM image of natural graphite according to Reference Example 1. In the drawings, a secondary electron image (drawing suffixed with A) and a corresponding reflection electron image (drawing suffixed with B) are shown one above the other. Initially, the composite active materials according to Example 1 to Example 4, Example 8 to Example 14 and Comparative Example 1, which use LiNi$_{1/3}$Co$_{1/3}$Mn$_{1/3}$O$_2$ particles (active material particles) as a raw material, will be analyzed. From FIG. 19A, on the surface of the composite active material according to Comparative Example 1, the grain boundaries of the sulfide-based solid electrolyte particles are independently and clearly recognized. For this reason, it appears that, in the manufacturing method according to Comparative Example 1, a sufficient energy at which the sulfide-based solid electrolyte particles plastically deform was not applied. In FIG. 19B, a bright color portion (niobium element, and the like) and a dark color portion (phosphorus element, sulfur element, and the like) are clearly separated. For this reason, it appears that, in the composite active material according to Comparative Example 1, the oxide-based solid electrolyte that contains a niobium element is not sufficiently coated with the sulfide-based solid electrolyte that contains a phosphorus element, and the like, and the oxide-based solid electrolyte is exposed to the surface of the composite active material. On the other hand, as is apparent from FIG. 4A to FIG. 14A, on the surface of each of the composite active materials according to Example 1 to Example 4, and Example 8 to Example 14, the sulfide-based solid electrolyte particles are bound to each other, and the grain boundaries are not clear. For this reason, it appears that, at least in the manufacturing methods according to Example 1 to Example 4, and Example 8 to Example 14, a sufficient energy at which the sulfide-based solid electrolyte particles plastically deform was applied. In FIG. 4B to FIG. 14B, a bright color portion (niobium element, and the like) and a dark color portion (phosphorus element, sulfur element, and the like) are mixed with each other, and an element distribution is more uniform than that of FIG. 19B. For this reason, it appears that, at least in the composite active materials according to Example 1 to Example 4, and Example 8 to Example 14, the oxide-based solid electrolyte that contains a niobium element is sufficiently coated with the sulfide-based solid electrolyte that contains a phosphorus element, and the like.

Among these examples, when Example 1 to Example 4 and Example 8 (FIG. 4A to FIG. 8B) are particularly analyzed, it appears that grain boundaries between the sulfide-based solid electrolyte particles disappear and an element distribution becomes uniform with an increase in the kneading time in the coating step, that is, 1 minute (Example 1), 2 minutes (Example 2), 4 minutes (Example 3), 8 minutes (Example 4) and 30 minutes (Example 8). When Example 9 to Example 11 (FIG. 9A to FIG. 11B) are analyzed, it appears that grain boundaries between the sulfide-based solid electrolyte particles disappear and an element distribution becomes uniform with an increase in the kneading time in the coating step, that is, 10 minutes (Example 9), 20 minutes (Example 10) and 30 minutes (Example 11). Furthermore, when Example 9 to Example 11 (FIG. 9A to FIG. 11B) are compared with Example 1 to Example 4, and Example 8 (FIG. 4A to FIG. 8B), it appears that a surface free energy is high because of no pretreatment step and, as a result, the sulfide-based solid electrolyte is easily coated with the composite particles. Thus, it appears that an energy at which the sulfide-based solid electrolyte plastically deforms is allowed to be more efficiently applied under the conditions of Example 9 to Example 11 in which no pretreatment step is carried out than under the conditions of Example 1 to Example 4, and Example 8 in which the pretreatment step is carried out.

Furthermore, when Example 12 and Example 13 (FIG. 12A to FIG. 13B) are compared with Example 1 to Example 4, and Example 8 to Example 11 (FIG. 4A to FIG. 11B), it appears that the sulfide-based solid electrolyte particles are bound to each other with more plastically deformed in Example 12 and Example 13, and the bright color portion (niobium element, and the like) is completely coated with the dark color portion (phosphorus element, sulfur element, and the like). Thus, it appears that an energy at which the sulfide-based solid electrolyte plastically deforms is allowed to be more efficiently applied under the conditions of Example 12 and Example 13 in which the sulfide-based solid electrolyte particles having a mean particle diameter of 0.8 μm were used than under the conditions of Example 1 to Example 4, and Example 8 to Example 11 in which the sulfide-based solid electrolyte particles having a mean particle diameter of 1.5 μm were used.

Figure 14A:
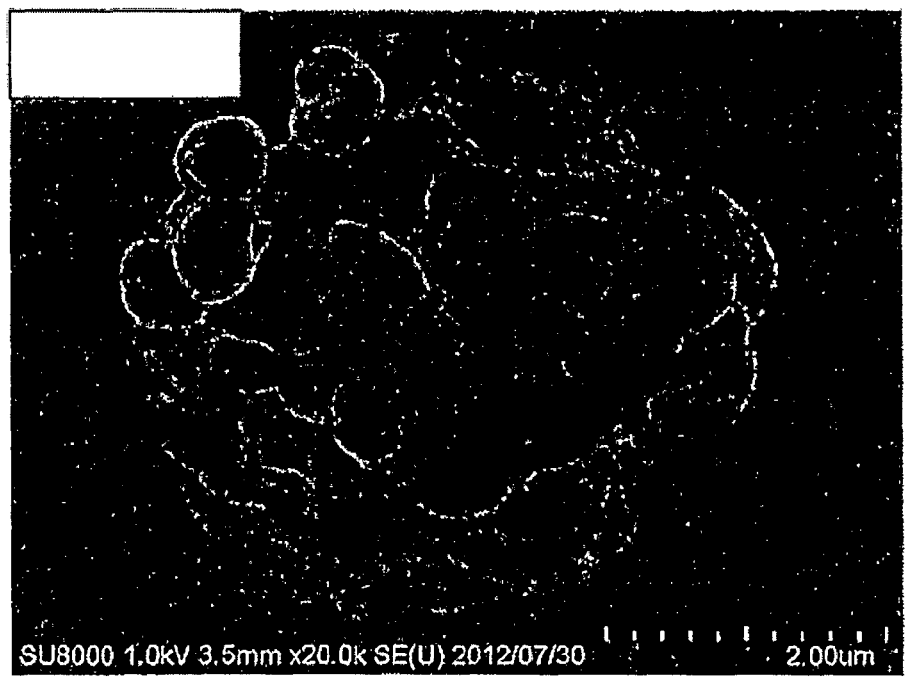
FIG. 14A and FIG. 14B are surface SEM images of a composite active material according to Example 14.
Figure 14B:
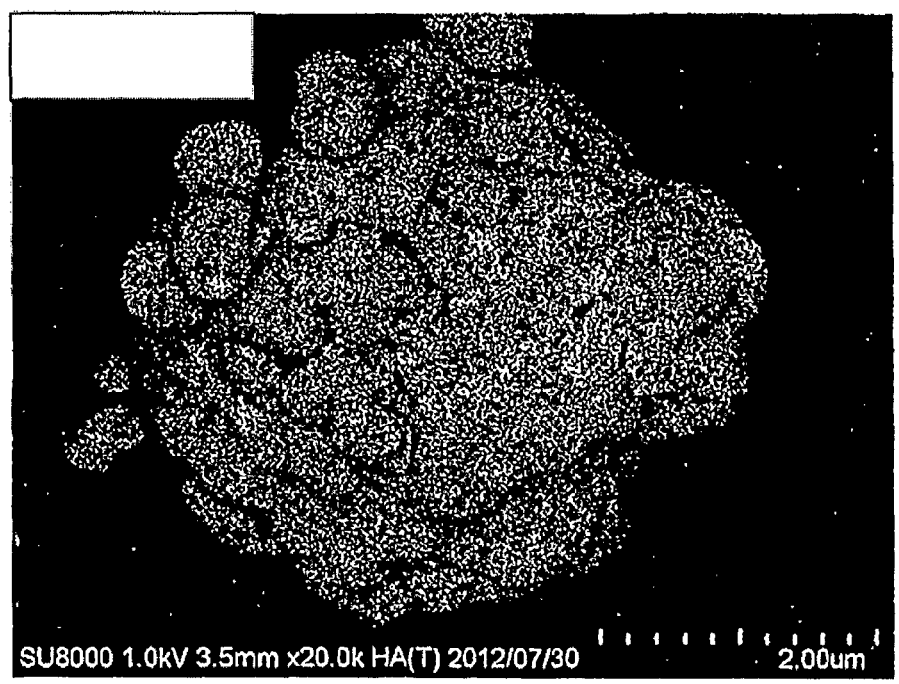
Figure 15A:
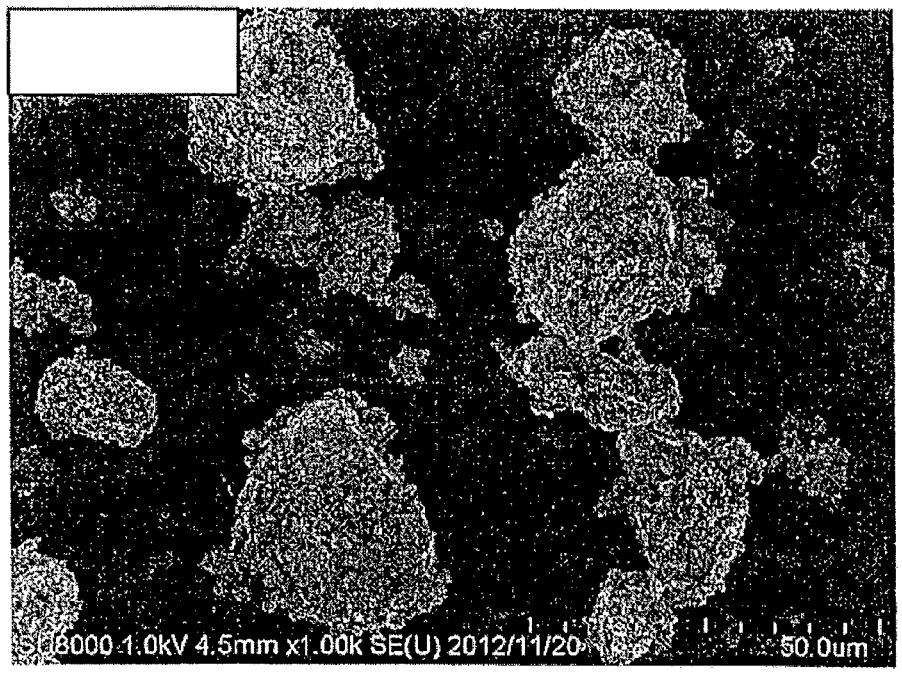
FIG. 15A and FIG. 15B are surface SEM images of a composite active material according to Reference Example 1.
Figure 15B:
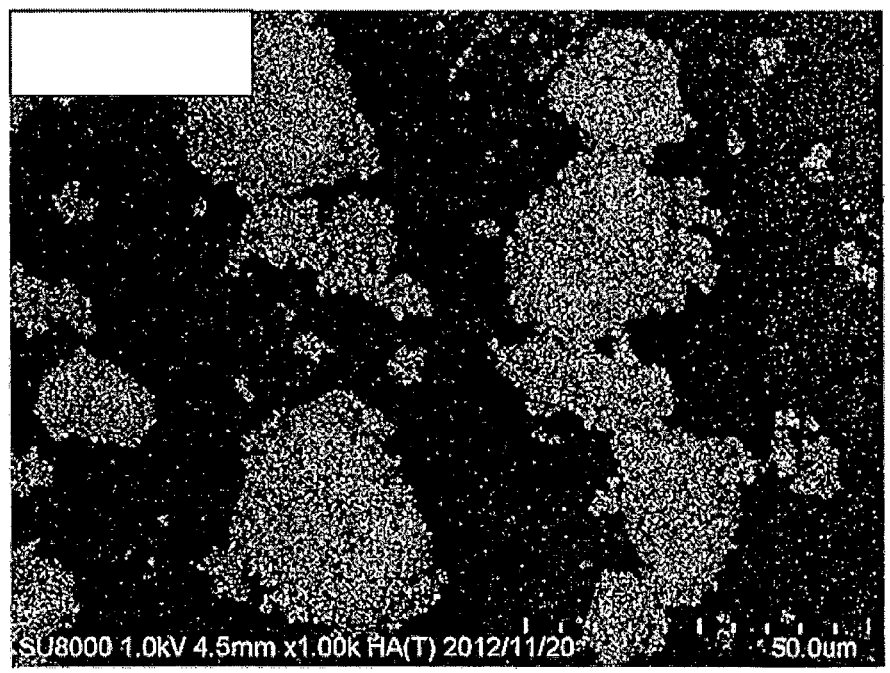

Furthermore, when Example 14 (FIG. 14A and FIG. 14B) is compared with Example 1 to Example 4, and Example 8 to Example 13 (FIG. 4A to FIG. 13B), the sulfide-based solid electrolyte particles are bound to each other more integrally in Example 14 than the other examples and only a dark color portion (phosphorus element, sulfur element, and the like) is recognized in the reflection electron image (FIG. 14B). Thus, it appears that an energy at which the sulfide-based solid electrolyte plastically deforms is allowed to be more efficiently applied under the condition of Example 14 in which the sulfide-based solid electrolyte particles were put in three times separately in the coating step than under the conditions of Example 1 to Example 4, and Example 8 to Example 13 in which the sulfide-based solid electrolyte particles were put in at a time in the coating step.

Next, the composite active material according to Reference Example 1, which uses natural graphite particles (active material particles) as a raw material, will be analyzed. As is apparent from a comparison between FIG. 15A and FIG. 20A, it appears that the surface of natural graphite is coated with the sulfide-based solid electrolyte substantially without any gap in the composite active material according to Reference Example 1. As is apparent from a comparison between FIG. 15B and FIG. 20B, a darkest color portion (carbon element, and the like) is completely coated with a relatively bright color portion (phosphorus element, sulfur element, and the like). For this reason, it appears that the surface of each of natural graphite particles is sufficiently coated with the sulfide-based solid electrolyte that contains a phosphorus element, and the like, in the composite active material according to Reference Example 1.

3. Evaluation of Coverage of Composite Active Material

The composite active materials according to Example 1 to Example 14 and Comparative Example 1 were measured by X-ray photoelectron spectroscopy (XPS). The details of the measurement method are as follows.

X-ray Photoelectron Spectrometer: Produced by Physical Electronics, Quantera SXM (product name)
X-ray Source: Monochromatic AlK$_\alpha$
X-ray Output: 44.8 W
X-ray Beam Size: 200 μmφ)

An element ratio (ER) was calculated from the peak cross-sectional area of each element in the obtained XPS spectrum. The obtained element ratio (ER) was substituted into the following mathematical expression (B 1), and the coverage was, calculated. The result is shown in Table 1.

$$\text{Coverage} = (ER_P + ER_S + ER_I)/(ER_{Mn} + ER_{Co} + ER_{Ni} + ER_{Nb} + ER_P + ER_S + ER_I) \quad (B1)$$

(In the above mathematical expression (B1), $ER_P$ denotes the element ratio of a phosphorus element, $ER_S$ denotes the element ratio of a sulfur element, $ER_I$ denotes the element ratio of an iodine element, $ER_{Mn}$ denotes the element ratio of a manganese element, $ER_{Co}$ denotes the element ratio of a cobalt element, $ER_{Ni}$ denotes the element ratio of a nickel element, and $ER_{Nb}$ denotes the element ratio of a niobium element.

FIG. 16 is a graph that shows the correlation between the coverage of the sulfide-based solid electrolyte in each of the composite active materials according to Example 1 to Example 14 and Comparative Example 1 and the kneading time in the coating step. As shown in FIG. 16, the composite active materials according to Example 1 to Example 14 in which the coating step was carried out each have a higher coverage of the sulfide-based solid electrolyte than the composite active material according to Comparative Example 1 in which no coating step was carried out. It appears from FIG. 16 that, in the composite active materials according to Example 1 to Example 8 in which the pretreatment step was carried out, the coverage of the sulfide-based solid electrolyte improves as the kneading time in the coating step extends but improvement in the coverage of the sulfide-based solid electrolyte stops at an upper limit of 88% for the kneading time of 25 minutes or longer. It appears from FIG. 16 that, in the composite active materials according to Example 9 to Example 11 in which no pretreatment step was carried out and the sulfide-based solid electrolyte particles having a mean particle diameter of 1.5 μm were used as well, the coverage of the sulfide-based solid electrolyte improves as the kneading time in the coating step extends but improvement in the coverage of the sulfide-based solid electrolyte stops at an upper limit of 93% for the kneading time of 20 minutes or longer. When the examples of the same kneading time are compared with each other, the coverage of the sulfide-based solid electrolyte is higher in Example 10 (kneading time: 20 minutes) than in Example 7 (kneading time: 20 minutes), and the coverage of the sulfide-based solid electrolyte is higher in Example 11 (kneading time: 30 minutes) than in Example 8 (kneading time: 30 minutes). The composite active materials according to Example 12 to Example 14 in which no pretreatment step was carried out and the sulfide-based solid electrolyte particles having a mean particle diameter 0.8 μm were used have a higher coverage of the sulfide-based solid electrolyte by 4% or more than the composite active materials according to Example 1 to Example 11. Among others, the composite active material according to Example 14 exhibited the highest coverage of the sulfide-based solid electrolyte, that is, 99.0%.

4. Manufacturing of Lithium Secondary Battery

Hereinafter, lithium secondary batteries were respectively manufactured by using the above-described composite active materials according to Example 1 to Example 14 and Comparative Example 1. Any one of the above-described composite active materials was prepared as the positive electrode active material, $48.5Li_2S-17.5P_2S_5-4Li_2O-30LiI$ particles were prepared as the sulfide-based solid electrolyte, vapor-grown carbon fiber (VGCF) was prepared as the electrically conductive material, and PVdF was prepared as the binder. These positive electrode active material, sulfide-based solid electrolyte, electrically conductive material and binder were mixed such that Positive electrode active material: Sulfide-based solid electrolyte: Electrically conductive material: Binder=79.3 percent by weight: 17.1 percent by weight: 2.4 percent by weight: 1.2 percent by weight. Thus, a positive electrode mixture was prepared. $48.5Li_2S-17.5P_2S_5-4Li_2O-30LiI$ particles that are the sulfide-based solid electrolyte were prepared as the raw material of a separator layer (solid electrolyte layer). Natural graphite was prepared as the negative electrode active material, $48.5Li_2S-17.5P_2S_5-4Li_2O-30LiI$ particles were prepared as the sulfide-based solid electrolyte, and PVdF was prepared as the binder. These negative electrode active material, sulfide-based solid electrolyte and binder were mixed such that Negative electrode active material: Sulfide-based solid electrolyte: Binder=57.0 percent by weight: 41.6 percent by weight: 1.4 percent by weight. Thus, a negative electrode mixture was prepared. First, a green compact of $48.5Li_2S-17.5P_2S_5-4Li_2O-30LiI$ particles was formed. Subsequently, the positive electrode mixture was arranged on one face of the green compact, the negative electrode mixture was arranged on the other face, and these were subjected to flat press for a pressing time of 1 minute under a pressing pressure of 6 ton/cm². Thus, a laminated body was obtained. In the laminated body obtained at this time, the thickness of the positive electrode mixture layer and the thickness of the negative electrode mixture layer each are 130 µm, and the thickness of the separator layer was 20 µm. By restraining the laminated body under the pressure of 0.2 N in the laminated direction, the lithium secondary battery was manufactured. Hereinafter, the lithium secondary batteries that respectively use the composite active materials according to Example 1 to Example 14 and Comparative Example 1 as raw materials are respectively referred to as lithium secondary batteries according to Example 1 to Example 14 and Comparative Example 1.

5. Measurement of Reaction Resistance of Lithium Secondary Battery

For each of the lithium secondary batteries according to Example 4, Example 8, Example 10 to Example 14 and Comparative Example 1, the reaction resistance was measured by the high-frequency impedance method. The details of the measurement method are as follows.

Voltage Amplitude: 10 mV

Frequency: 1 MHz to 0.1 Hz

Voltage: 3.52 V

FIG. 18 is a schematic view of a Nyquist diagram that is obtained through the high-frequency impedance method. Evaluations were made by defining a circular arc component indicating the range with the double-headed arrow in FIG. 18 as a reaction resistance.

Table 1 shows various manufacturing conditions of the composite active materials according to Example 1 to Example 14, Reference Example 1 and Comparative Example 1, the coverage of the sulfide-based solid electrolyte in each composite active material and the reaction resistance of each lithium secondary battery.

|  | Conditions in Manufacturing Method | | | | Coverage of Sulfide-based Solid Electrolyte (%) | Reaction Resistance ($\Omega \cdot cm^2$) |
|---|---|---|---|---|---|---|
|  | Rotation Speed (rpm) | Kneading Time (min) | Mean Particle Diameter of Sulfide-based Solid Electrolyte (µm) | Pretreatment Step | | |
| Example 1 | 3000 | 1 | 1.5 | Performed | 82.3 | — |
| Example 2 | 3000 | 2 | 1.5 | Performed | 82.9 | — |
| Example 3 | 3000 | 4 | 1.5 | Performed | 82.7 | — |
| Example 4 | 3000 | 8 | 1.5 | Performed | 84.2 | 14.6 |
| Example 5 | 3000 | 12 | 1.5 | Performed | 85.9 | — |
| Example 6 | 3000 | 16 | 1.5 | Performed | 85.5 | — |
| Example 7 | 3000 | 20 | 1.5 | Performed | 87.5 | — |
| Example 8 | 3000 | 30 | 1.5 | Performed | 87.7 | 11.5 |
| Example 9 | 3000 | 10 | 1.5 | Not-performed | 90.5 | — |
| Example 10 | 3000 | 20 | 1.5 | Not-performed | 92.7 | 10.3 |
| Example 11 | 3000 | 30 | 1.5 | Not-performed | 92.3 | 11.0 |
| Example 12 | 3000 | 30 | 0.8 | Not-performed | 97.0 | 13.2 |
| Example 13 | 3000 | 30 | 0.8 | Not-performed | 97.1 | 12.4 |
| Example 14 | 3000 | 60 | 0.8 | Not-performed | 99.0 | 14.1 |
| Reference Example 1 | 3000 | 60 | 0.8 | Not-performed | — | — |
| Comparative Example 1 | — | — | 0.8 | — | 75.6 | 15.0 |

FIG. 17 is a graph that shows the correlation between the coverage of the sulfide-based solid electrolyte in each of the composite active materials according to Example 4, Example 8, Example 10 to Example 14, and Comparative Example 1 and the reaction resistance of a corresponding one of the lithium secondary batteries that use the composite active materials. As shown in FIG. 17, each of the lithium secondary batteries according to Example 4, Example 8, and. Example 10 to Example 14 has a smaller reaction resistance than the lithium secondary battery according to Comparative Example 1. Thus, it appears that the composite active material according to the invention, obtained through the coating step, has the function of reducing the reaction resistance of the lithium secondary battery as compared to the existing composite active material. As shown in FIG. 17, when the coverage of the sulfide-based solid electrolyte is 93%, the reaction resistance of the lithium secondary battery has a local minimum value (10 Ω·cm$^2$). When the coverage of the composite active material falls within the range higher than or equal to 85% and lower than or equal to 95%, the reaction resistance of the lithium secondary battery is smaller than or equal to 12 Ω·cm$^2$. The reason why the reaction resistance exceeds 12 Ω·cm$^2$ when the coverage of the composite active material exceeds 95% is presumably that a contact probability between an electrical conduction aid, which is the electrode material, and the active material particles decreases and the electron conducting path is interrupted and, as a result, the resistance increases.

The invention claimed is:

1. A composite active material comprising:
   composite particles containing active material particles and an oxide-based solid electrolyte, the active material particles containing at least any one of a cobalt element, a nickel element and a manganese element and further containing a lithium element and an oxygen element, the oxide-based solid electrolyte coating all or part of a surface of each of the active material particles; and
   a sulfide-based solid electrolyte further coating 76.0% or more of a surface of each of the composite particles, where the sulfide-based solid electrolyte is directly coated on the surface of the composite particles.

2. The composite active material according to claim 1, wherein
   the sulfide-based solid electrolyte coats 85% or more and 95% or less of the surface of each of the composite particles.

3. A manufacturing method for a composite active material, comprising:
   a preparation step of preparing composite particles containing active material particles and an oxide-based solid electrolyte, the active material particles containing at least any one of a cobalt element, a nickel element and a manganese element and further containing a lithium element and an oxygen element, the oxide-based solid electrolyte coating all or part of a surface of each of the active material particles; and
   a coating step of coating a surface of each of the composite particles with a sulfide-based solid electrolyte by mixing the composite particles with the sulfide-based solid electrolyte with application of an energy, at which the sulfide-based solid electrolyte plastically deforms, while a temperature of a mixture of the composite particles and the sulfide-based solid electrolyte is adjusted to 100° C. or below.

4. The manufacturing method according to claim 3, wherein
   in the coating step, sulfide-based solid electrolyte particles having a mean particle diameter of 1μm or smaller are used as the sulfide-based solid electrolyte.

5. The manufacturing method according to claim 3, wherein
   in the coating step, the sulfide-based solid electrolyte is further added to the mixture after mixing for 10 minutes or longer, and is mixed with application of the energy, at which the sulfide-based solid electrolyte plastically deforms, while the temperature of the mixture is adjusted to 100° C. or below.

6. The manufacturing method according to claim 3, further comprising:
   a pretreatment step of mixing at least one of the composite particles and the sulfide-based solid electrolyte with a compound having an alkyl group before the coating step.

7. A lithium secondary battery comprising:
   a positive electrode;
   a negative electrode; and
   an electrolyte layer interposed between the positive electrode and the negative electrode, wherein
   at least one of the positive electrode and the negative electrode contains the composite active material according to claim 1.

8. A lithium secondary battery comprising:
   a positive electrode;
   a negative electrode; and
   an electrolyte layer interposed between the positive electrode and the negative electrode, wherein
   at least one of the positive electrode and the negative electrode contains the composite active material manufactured in accordance with the manufacturing method according to claim 3.

9. The composite active material according to claim 1, wherein
   the sulfide-based solid electrolyte coats 95% or less of the surface of each of the composite particles.

* * * * *